US010301100B2

(12) United States Patent
Sloat et al.

(10) Patent No.: US 10,301,100 B2
(45) Date of Patent: May 28, 2019

(54) PACKAGE FOR COMBINED STEAM AND MICROWAVE HEATING OF FOOD

(71) Applicant: Graphic Packaging International, Inc., Atlanta, GA (US)

(72) Inventors: Jeffrey T. Sloat, Broomfield, CO (US); Fermin P. Resurreccion, Jr., Thornton, CO (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 15/588,805

(22) Filed: May 8, 2017

(65) Prior Publication Data

US 2017/0240336 A1    Aug. 24, 2017

Related U.S. Application Data

(62) Division of application No. 14/286,311, filed on May 23, 2014, now Pat. No. 9,676,539.

(Continued)

(51) Int. Cl.
*B65D 81/34* (2006.01)
*A23L 5/10* (2016.01)
(Continued)

(52) U.S. Cl.
CPC ............ *B65D 81/3453* (2013.01); *A23L 5/13* (2016.08); *A23L 5/15* (2016.08); *B65D 43/02* (2013.01);
(Continued)

(58) Field of Classification Search
CPC ................ B65D 81/34; B65D 81/3446; B65D 81/3453; B65D 81/3461; B65D 43/02;
(Continued)

(56) References Cited

U.S. PATENT DOCUMENTS 104,423 A    6/1870   Casey
113,893 A    4/1871   Joyce et al.
(Continued)

FOREIGN PATENT DOCUMENTS

CH    672 585      12/1989
DE    28 10 175     9/1979
(Continued)

OTHER PUBLICATIONS

Notification of Reasons for Refusal for Japanese Application No. 2016-515114 dated Aug. 15, 2017, with English translation.
(Continued)

*Primary Examiner* — Drew E Becker
*Assistant Examiner* — Bryan Kim
(74) *Attorney, Agent, or Firm* — Womble Bond Dickinson (US) LLP

(57) ABSTRACT

A package for combined steam and microwave heating of food, wherein the package may include microwave energy interactive materials ("MEIMs") configured for providing rapid, simultaneous microwave and steam cooking in a domestic microwave oven. The MEIMs may be configured for controlling the heating pattern within the package and to control volumetric heating of food in the package. The MEIMs may include one or more of a susceptor, shield, and/or resonating patch antenna. The package may be paper-based, or it may be manufactured of any other suitable material. One or more of the different sections of the package may comprise separate chambers respectively for the steam source and the food to be steamed, so that the steam source and the food to be steamed are separated from one another during manufacturing, storage, and cooking.

18 Claims, 20 Drawing Sheets

Related U.S. Application Data

(60) Provisional application No. 61/827,389, filed on May 24, 2013.

(51) Int. Cl.
  *B65D 43/02* (2006.01)
  *A47J 27/05* (2006.01)
  *A47J 27/04* (2006.01)

(52) U.S. Cl.
  CPC ........... *A23V 2002/00* (2013.01); *A47J 27/04* (2013.01); *A47J 27/05* (2013.01); *B65D 2581/344* (2013.01); *B65D 2581/3435* (2013.01); *B65D 2581/3441* (2013.01); *B65D 2581/3456* (2013.01); *B65D 2581/3489* (2013.01); *B65D 2581/3491* (2013.01); *B65D 2581/3494* (2013.01); *B65D 2581/3497* (2013.01); *B65D 2581/3498* (2013.01); *Y10T 29/49826* (2015.01)

(58) Field of Classification Search
  CPC .... B65D 2581/3494; B65D 2581/3489; B65D 2581/3456; B65D 2581/344; B65D 81/3415; B65D 81/3438; B65D 81/343; B65D 2581/34; B65D 2581/3402; B65D 2581/3416–2581/3418; B65D 2581/342; B65D 2581/3422; B65D 2581/3425; B65D 2581/3427; B65D 2581/3433; B65D 2581/3435; B65D 2581/3491; B65D 2581/3493; B65D 2581/3498; A47J 27/04; A47J 27/043; A47J 27/05; A23L 5/13; A23L 5/15; A23L 5/17
  USPC ........ 426/106, 107, 110, 112, 113, 114, 115, 426/118, 119, 120, 129, 241, 243, 392, 426/394, 395, 403, 407, 520, 523; 206/503, 505, 509, 511, 514; 220/573.1, 220/573.4, 573.5, 592.28, 501
  See application file for complete search history.

(56) References Cited

U.S. PATENT DOCUMENTS

| | | | |
|---|---|---|---|
| 166,102 A | 7/1875 | Hennaman | |
| 181,823 A | 9/1876 | Cornwall | |
| 254,770 A | 3/1882 | Hurd | |
| 541,397 A | 6/1895 | Swartout | |
| 590,212 A | 9/1897 | Daesch | |
| 851,983 A | 4/1907 | Entringer | |
| 899,244 A | 9/1908 | Chase | |
| 902,181 A | 10/1908 | Tidow | |
| 948,198 A | 2/1910 | Wiegand | |
| 952,572 A | 3/1910 | Meyer | |
| 955,033 A | 4/1910 | Wing | |
| 1,099,603 A | 6/1914 | Ingersoll | |
| 1,263,004 A | 4/1918 | Tollagsen | |
| 1,341,960 A | 6/1920 | Meyer et al. | |
| 1,347,428 A | 7/1920 | Wittekind | |
| 1,476,910 A | 12/1923 | Naugle | |
| 1,519,510 A | 12/1924 | Santarsiero | |
| 1,630,787 A | 5/1927 | Cullen | |
| 1,756,787 A * | 4/1930 | Goughnour | A47J 27/62 126/369 |
| 1,765,862 A | 6/1930 | Clapp | |
| 1,906,592 A | 5/1933 | Hiester | |
| 1,944,089 A | 1/1934 | Litchfield | |
| 1,985,978 A | 5/1934 | Thomas | |
| 2,021,465 A | 11/1935 | Ritscher | |
| 2,039,374 A | 5/1936 | Young | |
| 2,041,227 A | 5/1936 | Chalmers | |
| 2,107,480 A * | 2/1938 | Holton | A47J 27/04 126/377.1 |
| 2,149,872 A | 3/1939 | Schmidt | |
| 2,200,977 A | 5/1940 | Baxter | |
| 2,271,921 A | 2/1942 | Luker | |
| 2,290,396 A | 7/1942 | Webster | |
| 2,540,036 A | 1/1951 | Spencer | |
| 2,556,115 A | 6/1951 | Smith | |
| 2,559,101 A | 7/1951 | Wool | |
| 2,576,862 A | 11/1951 | Smith et al. | |
| 2,591,578 A | 4/1952 | McNealy et al. | |
| 2,600,566 A | 6/1952 | Moffett | |
| 2,650,485 A | 9/1953 | La Greca | |
| 2,660,529 A | 11/1953 | Bloom | |
| 2,667,422 A | 1/1954 | Kauffman | |
| 2,673,805 A | 3/1954 | Colman | |
| 2,673,806 A | 3/1954 | Colman | |
| 2,714,070 A | 7/1955 | Welch | |
| 2,741,559 A | 4/1956 | Banowitz | |
| 2,777,769 A | 1/1957 | Hodges | |
| 2,801,930 A | 8/1957 | Paulucci | |
| 2,805,392 A | 9/1957 | Schnoll | |
| 2,852,898 A | 9/1958 | Berg | |
| 2,858,970 A | 11/1958 | Barnes et al. | |
| 2,865,768 A | 12/1958 | Barnes et al. | |
| D185,399 S | 6/1959 | Tupper | |
| 2,960,218 A | 11/1960 | Cheeley | |
| 2,961,520 A | 11/1960 | Long | |
| 2,965,501 A | 12/1960 | Harriss | |
| 3,012,895 A | 12/1961 | Stelnicki | |
| 3,027,261 A | 3/1962 | Samara | |
| 3,035,754 A | 5/1962 | Meister | |
| 3,052,554 A | 9/1962 | Colman | |
| 3,068,779 A | 12/1962 | Eidlisz | |
| 3,070,275 A | 12/1962 | Bostrom | |
| 3,107,989 A | 10/1963 | Fesco | |
| 3,109,359 A | 11/1963 | Falla | |
| 3,141,400 A | 7/1964 | Powers | |
| 3,179,036 A | 4/1965 | Luker | |
| 3,191,520 A | 6/1965 | Halter | |
| 3,219,460 A | 11/1965 | Brown | |
| 3,220,635 A | 11/1965 | Kasting et al. | |
| 3,220,856 A | 11/1965 | Vischer | |
| 3,240,610 A | 3/1966 | Cease | |
| 3,244,537 A | 4/1966 | Cease | |
| 3,246,446 A | 4/1966 | Powers | |
| 3,262,668 A | 7/1966 | Luker | |
| 3,271,169 A | 9/1966 | Baker et al. | |
| 3,286,832 A | 11/1966 | Pilger | |
| 3,287,140 A | 11/1966 | Brussell | |
| 3,293,048 A | 12/1966 | Kitterman | |
| 3,326,097 A | 6/1967 | Lokey | |
| 3,349,941 A | 10/1967 | Wanderer | |
| 3,353,327 A | 11/1967 | Cutler et al. | |
| 3,353,707 A | 11/1967 | Eyles | |
| 3,357,152 A | 12/1967 | Geigel | |
| 3,396,868 A | 8/1968 | Fitzgerald | |
| 3,420,397 A | 1/1969 | Miller | |
| 3,421,654 A | 1/1969 | Hexel | |
| 3,424,342 A | 1/1969 | Scopp et al. | |
| 3,445,050 A | 5/1969 | Peters et al. | |
| 3,447,714 A | 6/1969 | Elliot | |
| 3,489,075 A | 1/1970 | O'Reilly | |
| 3,521,788 A | 7/1970 | Carter et al. | |
| 3,547,661 A | 12/1970 | Stevenson | |
| 3,608,770 A | 9/1971 | Naimoli | |
| 3,610,135 A | 10/1971 | Sheridan | |
| 3,610,458 A | 10/1971 | Nissley | |
| 3,615,646 A | 10/1971 | Neely et al. | |
| 3,620,834 A | 11/1971 | Duffy | |
| 3,637,132 A | 1/1972 | Gray | |
| 3,638,784 A | 2/1972 | Bodolay et al. | |
| 3,641,926 A | 2/1972 | Williams et al. | |
| 3,647,508 A | 3/1972 | Gorrell | |
| 3,669,688 A | 6/1972 | Thompson | |
| 3,718,480 A | 2/1973 | Tremblay et al. | |
| 3,741,427 A | 6/1973 | Doyle | |
| 3,777,447 A | 12/1973 | Herbine et al. | |
| 3,811,374 A | 5/1974 | Mann | |
| 3,835,280 A | 9/1974 | Gades et al. | |
| 3,836,042 A | 9/1974 | Petitto | |

(56) References Cited

U.S. PATENT DOCUMENTS

| | | |
|---|---|---|
| 3,844,409 A | 10/1974 | Bodolay et al. |
| 3,851,574 A | 12/1974 | Katz et al. |
| 3,865,301 A | 2/1975 | Pothier et al. |
| 3,873,735 A | 3/1975 | Chalin et al. |
| 3,881,027 A | 4/1975 | Levinson |
| 3,884,213 A | 5/1975 | Smith |
| 3,884,383 A | 5/1975 | Burch et al. |
| 3,893,567 A | 7/1975 | Davis et al. |
| 3,908,029 A | 9/1975 | Fredrickson |
| 3,938,730 A | 2/1976 | Detzel et al. |
| 3,941,967 A | 3/1976 | Sumi et al. |
| 3,956,866 A | 5/1976 | Lattur |
| 3,965,323 A | 6/1976 | Forker, Jr. et al. |
| 3,970,241 A | 7/1976 | Hanson |
| 3,973,045 A | 8/1976 | Brandberg et al. |
| 3,974,353 A | 8/1976 | Goltsos |
| 3,975,552 A | 8/1976 | Stangroom |
| 3,983,256 A | 9/1976 | Norris et al. |
| 3,985,990 A | 10/1976 | Levinson |
| 4,018,355 A | 4/1977 | Ando |
| 4,031,261 A | 6/1977 | Durst |
| 4,036,423 A | 7/1977 | Gordon |
| 4,038,425 A | 7/1977 | Brandberg et al. |
| 4,043,098 A | 8/1977 | Putnam, Jr. et al. |
| 4,065,583 A | 12/1977 | Ahlgren |
| 4,077,853 A | 3/1978 | Coll-Palagos |
| 4,082,184 A | 4/1978 | Hammer |
| 4,082,691 A | 4/1978 | Berger |
| 4,096,948 A | 6/1978 | Kuchenbecker |
| 4,113,095 A | 9/1978 | Dietz et al. |
| 4,118,913 A | 10/1978 | Putnam, Jr. et al. |
| 4,126,945 A | 11/1978 | Manser et al. |
| 4,132,811 A | 1/1979 | Standing et al. |
| 4,133,896 A | 1/1979 | Standing et al. |
| 4,136,505 A | 1/1979 | Putnam, Jr. et al. |
| 4,140,889 A | 2/1979 | Mason et al. |
| 4,154,860 A | 5/1979 | Daswick |
| 4,156,806 A | 5/1979 | Teich et al. |
| 4,164,174 A | 8/1979 | Wallsten |
| 4,171,605 A | 10/1979 | Putnam, Jr. et al. |
| 4,184,061 A | 1/1980 | Suzuki et al. |
| 4,186,217 A | 1/1980 | Tchack |
| 4,190,757 A | 2/1980 | Turpin et al. |
| 4,196,331 A | 4/1980 | Leveckis et al. |
| D255,751 S | 7/1980 | Daenen |
| 4,219,573 A | 8/1980 | Borek |
| 4,228,945 A | 10/1980 | Wysocki |
| 4,230,767 A | 10/1980 | Isaka et al. |
| 4,230,924 A | 10/1980 | Brastad et al. |
| 4,233,325 A | 11/1980 | Slangan et al. |
| 4,236,063 A | 11/1980 | Glucksman |
| 4,241,563 A | 12/1980 | Muller et al. |
| 4,242,378 A | 12/1980 | Arai |
| 4,258,086 A | 3/1981 | Beall |
| 4,264,668 A | 4/1981 | Balla |
| 4,267,420 A | 5/1981 | Brastad |
| 4,279,933 A | 7/1981 | Austin et al. |
| 4,280,032 A | 7/1981 | Levison |
| 4,283,427 A | 8/1981 | Winters et al. |
| 4,291,520 A | 9/1981 | Prince et al. |
| 4,292,332 A | 9/1981 | McHam |
| 4,306,133 A | 12/1981 | Levinson |
| 4,316,070 A | 2/1982 | Prosise et al. |
| 4,317,017 A | 2/1982 | Bowen |
| 4,324,088 A | 4/1982 | Yamashita et al. |
| 4,328,254 A | 5/1982 | Waldburger |
| 4,335,291 A | 6/1982 | Ishino et al. |
| 4,340,138 A | 7/1982 | Bernhardt |
| 4,345,133 A | 8/1982 | Cherney et al. |
| 4,348,421 A | 9/1982 | Sakakibara et al. |
| 4,351,997 A | 9/1982 | Mattisson et al. |
| 4,355,757 A | 10/1982 | Roccaforte |
| 4,373,511 A | 2/1983 | Miles et al. |
| 4,377,493 A | 3/1983 | Boylan et al. |
| 4,389,438 A | 6/1983 | Ohtsuki et al. |
| 4,390,555 A | 6/1983 | Levison |
| 4,398,994 A | 8/1983 | Beckett |
| 4,416,906 A | 11/1983 | Watkins |
| 4,425,368 A | 1/1984 | Watkins |
| 4,439,656 A | 3/1984 | Peleg |
| 4,453,665 A | 6/1984 | Roccaforte et al. |
| 4,461,031 A | 7/1984 | Blamer |
| 4,477,705 A | 10/1984 | Danley et al. |
| 4,478,349 A | 10/1984 | Haverland et al. |
| 4,481,392 A | 11/1984 | Nibbe et al. |
| 4,486,640 A | 12/1984 | Bowen et al. |
| 4,493,685 A | 1/1985 | Blamer |
| 4,496,815 A | 1/1985 | Jorgensen |
| 4,517,045 A | 5/1985 | Beckett |
| 4,518,651 A | 5/1985 | Wolfe, Jr. |
| 4,529,089 A | 7/1985 | Gasbarra et al. |
| 4,532,397 A | 7/1985 | McClelland |
| D280,058 S | 8/1985 | Carlson |
| 4,535,889 A | 8/1985 | Terauds |
| 4,552,614 A | 11/1985 | Beckett |
| 4,553,010 A | 11/1985 | Bohrer et al. |
| 4,571,337 A | 2/1986 | Cage et al. |
| 4,581,989 A | 4/1986 | Swartley |
| 4,584,202 A | 4/1986 | Roccaforte |
| 4,586,649 A | 5/1986 | Webinger |
| 4,610,755 A | 9/1986 | Beckett |
| 4,612,431 A | 9/1986 | Brown et al. |
| 4,626,352 A | 12/1986 | Massey et al. |
| 4,640,838 A | 2/1987 | Isakson et al. |
| 4,641,005 A | 2/1987 | Seiferth |
| 4,657,141 A | 4/1987 | Sorensen |
| 4,661,671 A | 4/1987 | Maroszek |
| 4,661,672 A | 4/1987 | Nakanaga |
| 4,677,905 A | 7/1987 | Johnson |
| 4,678,882 A | 7/1987 | Bohrer et al. |
| D291,522 S | 8/1987 | Daenen et al. |
| 4,685,997 A | 8/1987 | Beckett |
| 4,697,703 A | 10/1987 | Will |
| 4,701,585 A | 10/1987 | Stewart |
| 4,703,148 A | 10/1987 | Mikulski et al. |
| 4,703,149 A | 10/1987 | Sugisawa et al. |
| 4,705,927 A | 11/1987 | Levendusky et al. |
| 4,713,510 A | 12/1987 | Quick et al. |
| 4,714,012 A | 12/1987 | Hernandez |
| 4,727,706 A | 3/1988 | Beer |
| 4,734,288 A | 3/1988 | Engstrom et al. |
| 4,738,882 A | 4/1988 | Rayford et al. |
| 4,739,698 A | 4/1988 | Allaire |
| 4,739,898 A | 4/1988 | Brown |
| 4,745,249 A | 5/1988 | Daniels |
| 4,777,053 A | 10/1988 | Tobelmann et al. |
| 4,794,005 A | 12/1988 | Swiontek |
| 4,797,010 A | 1/1989 | Coelho |
| 4,803,088 A | 2/1989 | Yamamoto et al. |
| 4,804,582 A | 2/1989 | Noding et al. |
| 4,806,718 A | 2/1989 | Seaborne et al. |
| 4,808,780 A | 2/1989 | Seaborne |
| 4,810,845 A | 3/1989 | Seaborne |
| 4,818,831 A | 4/1989 | Seaborne |
| 4,825,025 A | 4/1989 | Seiferth |
| 4,842,876 A | 6/1989 | Anderson et al. |
| 4,846,350 A | 7/1989 | Sorensen |
| 4,848,579 A | 7/1989 | Barnes et al. |
| 4,851,246 A | 7/1989 | Maxwell et al. |
| 4,853,505 A | 8/1989 | Sorenson |
| 4,853,509 A | 8/1989 | Murakami |
| 4,864,089 A | 9/1989 | Tighe et al. |
| 4,864,090 A | 9/1989 | Maxwell et al. |
| 4,870,233 A | 9/1989 | McDonald et al. |
| 4,873,919 A | 10/1989 | Janssen |
| 4,883,936 A | 11/1989 | Maynard et al. |
| 4,892,744 A | 1/1990 | Ylvisaker |
| 4,896,009 A | 1/1990 | Pawlowski |
| 4,899,925 A | 2/1990 | Bowden et al. |
| 4,904,488 A | 2/1990 | LaBaw et al. |
| 4,914,266 A | 4/1990 | Parks et al. |
| 4,915,216 A | 4/1990 | Magers |
| 4,915,780 A | 4/1990 | Beckett |
| 4,923,704 A | 5/1990 | Levinson |

(56) References Cited

U.S. PATENT DOCUMENTS

| | | |
|---|---|---|
| 4,924,048 A | 5/1990 | Bunce et al. |
| 4,935,592 A | 6/1990 | Oppenheimer |
| 4,939,332 A | 7/1990 | Hahn |
| 4,943,456 A | 7/1990 | Pollart et al. |
| 4,948,932 A | 8/1990 | Clough |
| 4,952,765 A | 8/1990 | Toyosawa |
| 4,959,516 A | 9/1990 | Tighe et al. |
| 4,960,598 A | 10/1990 | Swiontek |
| 4,961,944 A | 10/1990 | Matoba et al. |
| 4,963,708 A | 10/1990 | Kearns et al. |
| D312,189 S | 11/1990 | Noel |
| 4,973,810 A | 11/1990 | Brauner |
| 4,982,064 A | 1/1991 | Hartman et al. |
| 4,987,280 A | 1/1991 | Kanafani et al. |
| 4,990,349 A | 2/1991 | Chawan et al. |
| 4,992,638 A | 2/1991 | Hewitt et al. |
| 5,002,826 A | 3/1991 | Pollart et al. |
| 5,011,299 A | 4/1991 | Black, Jr. et al. |
| 5,025,715 A | 6/1991 | Sir |
| 5,026,958 A | 6/1991 | Palacios |
| 5,035,800 A | 7/1991 | Kopach |
| 5,038,009 A | 8/1991 | Babbitt |
| 5,039,001 A | 8/1991 | Kinigakis et al. |
| 5,041,295 A | 8/1991 | Perry et al. |
| 5,044,777 A | 9/1991 | Watkins et al. |
| 5,050,791 A | 9/1991 | Bowden et al. |
| 5,052,369 A | 10/1991 | Johnson |
| 5,057,331 A | 10/1991 | Levinson |
| D321,302 S | 11/1991 | Zimmerman |
| 5,063,072 A | 11/1991 | Gillmore et al. |
| 5,075,526 A | 12/1991 | Sklenak et al. |
| 5,077,066 A | 12/1991 | Mattson et al. |
| 5,081,330 A | 1/1992 | Brandberg et al. |
| 5,094,865 A | 3/1992 | Levinson |
| 5,095,186 A | 3/1992 | Scott Russell et al. |
| 5,106,635 A | 4/1992 | McCutchan et al. |
| 5,107,087 A | 4/1992 | Yamada et al. |
| 5,108,768 A | 4/1992 | So |
| 5,118,747 A | 6/1992 | Pollart et al. |
| 5,153,402 A | 10/1992 | Quick et al. |
| 5,176,284 A | 1/1993 | Sorensen |
| 5,189,947 A * | 3/1993 | Yim .................. A47J 27/04 126/369 |
| 5,190,777 A | 3/1993 | Anderson et al. |
| 5,195,829 A | 3/1993 | Watkins et al. |
| 5,199,347 A * | 4/1993 | Chen .................. A47J 27/04 126/369 |
| 5,200,590 A | 4/1993 | Bowen et al. |
| D335,445 S | 5/1993 | Detert et al. |
| D335,821 S | 5/1993 | Detert et al. |
| D336,242 S | 6/1993 | Detert et al. |
| 5,216,947 A | 6/1993 | Cheng |
| 5,223,291 A | 6/1993 | Levinson et al. |
| 5,230,914 A | 7/1993 | Akervik |
| 5,241,149 A | 8/1993 | Watanbe et al. |
| 5,294,765 A | 3/1994 | Archibald et al. |
| 5,298,708 A | 3/1994 | Babu et al. |
| 5,300,747 A | 4/1994 | Simon |
| 5,315,083 A | 5/1994 | Green |
| 5,363,750 A | 11/1994 | Miller et al. |
| D353,303 S | 12/1994 | Davis |
| 5,370,042 A | 12/1994 | Tolchin et al. |
| 5,410,135 A | 4/1995 | Pollart et al. |
| 5,412,187 A | 5/1995 | Walters et al. |
| 5,419,451 A | 5/1995 | Bitel, Jr. |
| 5,423,449 A | 6/1995 | Gordon et al. |
| 5,423,453 A | 6/1995 | Fritz |
| 5,520,301 A | 5/1996 | Sohn |
| D370,598 S | 6/1996 | Koch |
| 5,530,231 A | 6/1996 | Walters et al. |
| D371,963 S | 7/1996 | Ahern, Jr. |
| 5,540,381 A | 7/1996 | Davis |
| 5,558,798 A | 9/1996 | Tsai |
| D376,512 S | 12/1996 | Klemme |
| 5,588,587 A | 12/1996 | Stier et al. |
| D378,565 S | 3/1997 | Cousins |
| D378,566 S | 3/1997 | Cousins |
| 5,645,300 A | 7/1997 | Hill |
| 5,645,762 A | 7/1997 | Cook et al. |
| 5,650,084 A | 7/1997 | Bley |
| D384,555 S | 10/1997 | Bradley |
| 5,674,546 A | 10/1997 | Barnes et al. |
| D386,042 S | 11/1997 | Miller |
| 5,690,853 A | 11/1997 | Jackson et al. |
| 5,695,801 A | 12/1997 | Oh |
| 5,698,306 A | 12/1997 | Prosise et al. |
| 5,704,485 A | 1/1998 | Cautereels et al. |
| 5,718,933 A | 2/1998 | Fultz |
| D391,440 S | 3/1998 | Cousins |
| 5,726,426 A | 3/1998 | Davis et al. |
| 5,741,534 A | 4/1998 | Chung |
| 5,747,086 A | 5/1998 | Bows et al. |
| 5,753,895 A | 5/1998 | Olson et al. |
| 5,770,840 A | 6/1998 | Lorence |
| 5,807,597 A | 9/1998 | Barnes et al. |
| D405,561 S | 2/1999 | Willinger et al. |
| 5,866,041 A | 2/1999 | Svarz et al. |
| 5,871,790 A | 2/1999 | Monier et al. |
| 5,876,811 A | 3/1999 | Blackwell et al. |
| 5,900,264 A | 5/1999 | Gics |
| 5,913,966 A | 6/1999 | Arnone et al. |
| 5,916,470 A | 6/1999 | Besser et al. |
| 5,916,620 A | 6/1999 | Oh |
| 5,925,281 A | 7/1999 | Levinson |
| 5,928,554 A | 7/1999 | Olson et al. |
| 5,931,333 A | 8/1999 | Woodnorth et al. |
| 5,961,872 A | 10/1999 | Simon et al. |
| 5,970,858 A | 10/1999 | Boehm et al. |
| 5,974,953 A * | 11/1999 | Messerli .................. A47J 27/05 126/20 |
| 5,986,248 A | 11/1999 | Matsuno et al. |
| 5,988,045 A | 11/1999 | Housley |
| 5,988,050 A | 11/1999 | Foster, Jr. |
| D418,017 S | 12/1999 | Henry |
| D419,371 S | 1/2000 | Haley |
| 6,018,157 A | 1/2000 | Craft |
| 6,042,856 A | 3/2000 | Sagan et al. |
| D422,176 S | 4/2000 | Laib |
| 6,049,072 A | 4/2000 | Olson et al. |
| 6,097,017 A | 8/2000 | Pickford |
| 6,103,291 A | 8/2000 | Fernandez Tapia |
| 6,106,882 A | 8/2000 | Oh et al. |
| D432,414 S | 10/2000 | Simpson et al. |
| D432,914 S | 10/2000 | Hayes et al. |
| 6,126,976 A | 10/2000 | Hasse, Jr. et al. |
| 6,136,355 A | 10/2000 | Fukuyama |
| D433,884 S | 11/2000 | Fujimoto |
| 6,147,337 A | 11/2000 | Besser |
| 6,150,646 A | 11/2000 | Lai et al. |
| 6,167,799 B1 | 1/2001 | Macias |
| 6,168,044 B1 | 1/2001 | Zettle et al. |
| 6,175,105 B1 | 1/2001 | Rubbright et al. |
| 6,180,148 B1 | 1/2001 | Yajima |
| 6,180,150 B1 | 1/2001 | Schafer |
| 6,183,789 B1 | 2/2001 | Nilsson et al. |
| 6,187,354 B1 | 2/2001 | Hopkins |
| 6,192,792 B1 | 2/2001 | Gremillion |
| 6,196,406 B1 | 3/2001 | Ennis |
| 6,204,492 B1 | 3/2001 | Zeng et al. |
| 6,217,918 B1 | 4/2001 | Oh et al. |
| D441,597 S | 5/2001 | Wyche |
| D442,425 S | 5/2001 | Wyche |
| 6,229,131 B1 | 5/2001 | Koochaki |
| D445,633 S | 7/2001 | Bradley |
| D449,102 S | 10/2001 | Shin |
| D449,495 S | 10/2001 | Tucker et al. |
| 6,309,684 B2 | 10/2001 | Hopkins, Sr. |
| 6,394,337 B1 | 5/2002 | Ross et al. |
| 6,396,036 B1 | 5/2002 | Hanson |
| 6,433,322 B2 | 8/2002 | Zeng et al. |
| 6,455,084 B2 | 9/2002 | Johns |
| 6,463,844 B1 | 10/2002 | Wang et al. |
| 6,467,399 B1 | 10/2002 | Boutte |
| 6,486,455 B1 | 11/2002 | Merabet |

(56) References Cited

U.S. PATENT DOCUMENTS

| | | |
|---|---|---|
| D466,762 S | 12/2002 | Cote et al. |
| 6,502,501 B1 * | 1/2003 | Simon .................. A47J 27/04 99/345 |
| 6,509,047 B2 | 1/2003 | Edomwonyi |
| D470,768 S | 2/2003 | Melhede |
| 6,552,315 B2 | 4/2003 | Zeng et al. |
| 6,559,431 B2 | 5/2003 | Hopkins |
| 6,565,910 B1 | 5/2003 | Schell et al. |
| D477,187 S | 7/2003 | McCallister et al. |
| 6,608,292 B1 | 8/2003 | Barnes |
| 6,612,482 B2 | 9/2003 | Ross |
| 6,645,539 B2 | 11/2003 | Bukowski et al. |
| D485,473 S | 1/2004 | Dais et al. |
| 6,677,563 B2 | 1/2004 | Lai |
| 6,727,484 B2 | 4/2004 | Policappelli |
| 6,803,551 B2 | 10/2004 | Kim et al. |
| D497,774 S | 11/2004 | Smith et al. |
| 6,818,873 B2 | 11/2004 | Savage et al. |
| 6,840,159 B1 | 1/2005 | Li |
| D502,847 S | 3/2005 | Leonori |
| 6,868,980 B2 | 3/2005 | Schultz et al. |
| D505,048 S | 5/2005 | Cornfield |
| D505,590 S | 5/2005 | Greiner et al. |
| D508,822 S | 8/2005 | Smith et al. |
| D513,942 S | 1/2006 | De Groote |
| 7,008,214 B2 | 3/2006 | Faddi |
| 7,019,271 B2 | 3/2006 | Wnek et al. |
| 7,022,359 B2 | 4/2006 | Montserrate Gibernau |
| 7,025,213 B2 | 4/2006 | Chen |
| D521,380 S | 5/2006 | Jackson et al. |
| 7,038,181 B2 | 5/2006 | Edmark |
| 7,045,190 B2 | 5/2006 | Inagaki et al. |
| D526,840 S | 8/2006 | Carlson |
| 7,090,090 B2 | 8/2006 | Ohyama |
| D529,797 S | 10/2006 | Wilcox et al. |
| D543,796 S | 6/2007 | Lion et al. |
| D552,433 S | 10/2007 | Stewart |
| D557,982 S | 12/2007 | Ablo |
| D558,536 S | 1/2008 | Curtin |
| D558,602 S | 1/2008 | Kissner et al. |
| D563,157 S | 3/2008 | Bouveret et al. |
| D564,287 S | 3/2008 | Bouveret et al. |
| D564,307 S | 3/2008 | Repp |
| 7,351,942 B2 | 4/2008 | Wnek et al. |
| D571,656 S | 6/2008 | Maslowski |
| D577,295 S | 9/2008 | Miller et al. |
| D582,791 S | 12/2008 | Elmerhaus |
| 7,468,498 B2 | 12/2008 | Tuszkiewicz et al. |
| D584,111 S | 1/2009 | Eide et al. |
| D584,145 S | 1/2009 | Young |
| D590,663 S | 4/2009 | Simon et al. |
| D591,591 S | 5/2009 | Moecks et al. |
| D592,948 S | 5/2009 | Mayer |
| D593,369 S | 6/2009 | Green et al. |
| D594,328 S | 6/2009 | Shapiro et al. |
| D598,717 S | 8/2009 | Jalet |
| D607,095 S | 12/2009 | LeMay et al. |
| D610,903 S | 3/2010 | Shapiro et al. |
| D611,300 S | 3/2010 | Chen et al. |
| D612,196 S | 3/2010 | Furlong |
| D613,131 S | 4/2010 | Chen et al. |
| D630,507 S | 1/2011 | Short et al. |
| D630,940 S | 1/2011 | Shapiro et al. |
| D632,561 S | 2/2011 | Short et al. |
| D633,810 S | 3/2011 | Jenkins |
| 7,977,612 B2 | 7/2011 | Levy et al. |
| 8,302,528 B2 | 11/2012 | Pawlick et al. |
| 8,522,674 B2 * | 9/2013 | Lee ...................... A47J 27/084 99/416 |
| 8,772,685 B2 * | 7/2014 | Backaert .............. A47J 27/04 219/682 |
| 9,284,108 B2 | 3/2016 | Middleton et al. |
| 2001/0035402 A1 | 11/2001 | Barrow |
| 2001/0043971 A1 | 11/2001 | Johns |
| 2002/0096450 A1 | 7/2002 | Garst |
| 2002/0110622 A1 | 8/2002 | Lloyd et al. |
| 2003/0003200 A1 | 1/2003 | Bukowski et al. |
| 2003/0068411 A1 | 4/2003 | McCallister |
| 2003/0111463 A1 | 6/2003 | Lai |
| 2003/0213718 A1 | 11/2003 | Ducharme et al. |
| 2004/0058038 A1 | 3/2004 | Lee |
| 2004/0107637 A1 | 6/2004 | Sieverding |
| 2004/0121049 A1 | 6/2004 | Ebner et al. |
| 2004/0164075 A1 | 8/2004 | Henze et al. |
| 2004/0238438 A1 | 12/2004 | Chen |
| 2005/0040161 A1 | 2/2005 | Lin et al. |
| 2005/0051549 A1 | 3/2005 | Nelson |
| 2005/0069602 A1 | 3/2005 | Faddi |
| 2005/0079250 A1 | 4/2005 | Mao et al. |
| 2005/0079252 A1 | 4/2005 | Kendig et al. |
| 2005/0082305 A1 | 4/2005 | Dais et al. |
| 2005/0109772 A1 | 5/2005 | Thorpe et al. |
| 2005/0112243 A1 | 5/2005 | Bellmann |
| 2005/0115417 A1 | 6/2005 | Murat et al. |
| 2005/0208182 A1 | 9/2005 | Gilbert et al. |
| 2005/0220939 A1 | 10/2005 | Morrow |
| 2005/0229793 A1 | 10/2005 | Wengrovsky |
| 2005/0271776 A1 | 12/2005 | Siegel |
| 2005/0281921 A1 | 12/2005 | Langston et al. |
| 2006/0013929 A1 | 1/2006 | Morris et al. |
| 2006/0088678 A1 | 4/2006 | Berrier et al. |
| 2006/0110498 A1 | 5/2006 | Dellinger et al. |
| 2006/0118552 A1 | 6/2006 | Tiefenback |
| 2006/0121168 A1 | 6/2006 | Flaherty et al. |
| 2006/0151339 A1 | 7/2006 | Bradley et al. |
| 2006/0236593 A1 | 10/2006 | Cap |
| 2006/0260598 A1 | 11/2006 | Bjork et al. |
| 2006/0289522 A1 | 12/2006 | Middleton et al. |
| 2007/0029314 A1 | 2/2007 | Rodgers et al. |
| 2007/0059406 A1 | 3/2007 | Shahsavarani |
| 2007/0090103 A1 | 4/2007 | France et al. |
| 2007/0116806 A1 | 5/2007 | Parsons |
| 2007/0116807 A1 | 5/2007 | Parsons |
| 2007/0131679 A1 | 6/2007 | Edwards et al. |
| 2007/0181008 A1 | 8/2007 | Pawlick et al. |
| 2007/0251874 A1 | 11/2007 | Stewart |
| 2008/0035634 A1 | 2/2008 | Zeng et al. |
| 2008/0069485 A1 | 3/2008 | France et al. |
| 2008/0078759 A1 | 4/2008 | Wnek et al. |
| 2008/0138473 A1 | 6/2008 | Pawlick et al. |
| 2008/0178744 A1 | 7/2008 | Hill |
| 2008/0210686 A1 | 9/2008 | Shapiro et al. |
| 2009/0022858 A1 | 1/2009 | Pawlick |
| 2009/0035433 A1 | 2/2009 | France et al. |
| 2009/0078125 A1 | 3/2009 | Pawlick |
| 2009/0142455 A1 | 6/2009 | Parsons |
| 2009/0294439 A1 | 12/2009 | Lai |
| 2009/0297673 A1 | 12/2009 | Sebban |
| 2010/0015293 A1 | 1/2010 | Shapiro |
| 2010/0213192 A1 | 8/2010 | Middleton et al. |
| 2011/0083563 A1 | 4/2011 | Branson |
| 2011/0256284 A1 | 10/2011 | Jackson |
| 2012/0017772 A1 * | 1/2012 | Cohade ................ A47J 27/082 99/403 |
| 2012/0294988 A1 | 11/2012 | Munro |
| 2013/0327819 A1 | 12/2013 | Baker |

FOREIGN PATENT DOCUMENTS

| | | |
|---|---|---|
| EP | 0326105 | 8/1989 |
| EP | 0 449 643 | 10/1991 |
| EP | 1 245 504 | 10/2002 |
| EP | 1 352 841 | 10/2003 |
| EP | 1 352 848 | 10/2003 |
| EP | 1 514 804 | 3/2005 |
| EP | 1 464 262 | 7/2005 |
| EP | 1 612 150 | 1/2006 |
| EP | 1 749 757 | 2/2007 |
| EP | 2 204 114 A1 | 7/2010 |
| FR | 2 631 315 | 11/1989 |
| FR | 2 774 262 | 8/1999 |
| FR | 2 846 196 | 4/2004 |
| FR | 2 860 213 | 4/2005 |
| FR | 2 929 491 | 10/2009 |

(56) References Cited

FOREIGN PATENT DOCUMENTS

| | | |
|---|---|---|
| GB | 1 560 488 | 2/1980 |
| GB | 2 218 962 | 11/1989 |
| GB | 2 295 371 | 5/1996 |
| GB | 2 308 465 | 6/1997 |
| GB | 2 340 823 | 3/2000 |
| JP | 2-109882 | 4/1990 |
| JP | 3-240675 | 10/1991 |
| JP | 04-210007 | 7/1992 |
| JP | 43-67476 | 12/1992 |
| JP | 06293366 | 10/1994 |
| JP | 09051767 | 2/1997 |
| JP | 10094370 | 4/1998 |
| JP | 10-129742 | 5/1998 |
| JP | 11-91834 | 4/1999 |
| JP | 11113511 | 4/1999 |
| JP | 2001-55276 | 2/2001 |
| JP | 2001348074 | 12/2001 |
| JP | 2002-347851 | 12/2002 |
| JP | 2005059863 | 3/2005 |
| JP | 2005-312923 | 11/2005 |
| JP | 2006-34645 | 2/2006 |
| JP | 2011-73735 | 4/2011 |
| JP | 2012-046210 | 3/2012 |
| JP | 2012-218769 | 11/2012 |
| MX | 01011879 | 6/2002 |
| WO | WO 86/00275 | 1/1986 |
| WO | WO 96/07604 | 3/1996 |
| WO | WO 98/33399 | 8/1998 |
| WO | WO 99/59897 | 11/1999 |
| WO | WO 02/051716 | 7/2002 |
| WO | WO 03/086882 | 10/2003 |
| WO | WO 2004/045970 | 6/2004 |
| WO | WO 2006/098950 | 9/2006 |
| WO | WO 2006/128156 | 11/2006 |
| WO | WO 2006/136825 | 12/2006 |
| WO | WO 2007/003864 | 1/2007 |
| WO | WO 2007/127371 | 11/2007 |
| WO | WO 2008/109448 | 9/2008 |
| WO | WO 2009/097030 | 8/2009 |
| WO | WO 2009/136038 | 11/2009 |

OTHER PUBLICATIONS

Supplementary European Search Report for EP 14 80 0416 dated Dec. 7, 2016.
International Search Report and Written Opinion for PCT/US2014/039349 dated Sep. 1, 2014.
Office Action for U.S. Appl. No. 14/286,311 dated Jun. 25, 2015.
Response to Restriction Requirement for U.S. Appl. No. 14/286,311 dated Jul. 27, 2015.
Office Action for U.S. Appl. No. 14/286,311 dated Nov. 10, 2015.
Amendment A and Response to Office Action for U.S. Appl. No. 14/286,311 dated Jan. 29, 2016.
Office Action for U.S. Appl. No. 14/286,311 dated Mar. 30, 2016.
Request for Continued Examination (RCE) Transmittal for U.S. Appl. No. 14/286,311 dated Jun. 28, 2016.
Amendment B and Response to Final Office Action for U.S. Appl. No. 14/286,311 dated Jun. 28, 2016.
Office Action for U.S. Appl. No. 14/286,311 dated Sep. 19, 2016.
Amendment C and Response to Office Action for U.S. Appl. No. 14/286,311 dated Dec. 14, 2016.
Notice of Allowance and Fee(s) Due for U.S. Appl. No. 14/286,311 dated Feb. 15, 2017.
Issue Fee Transmittal for U.S. Appl. No. 14/286,311 dated May 8, 2017.

* cited by examiner

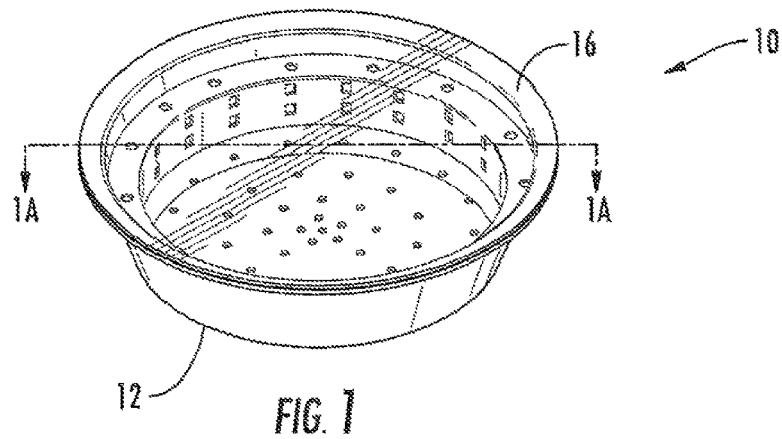
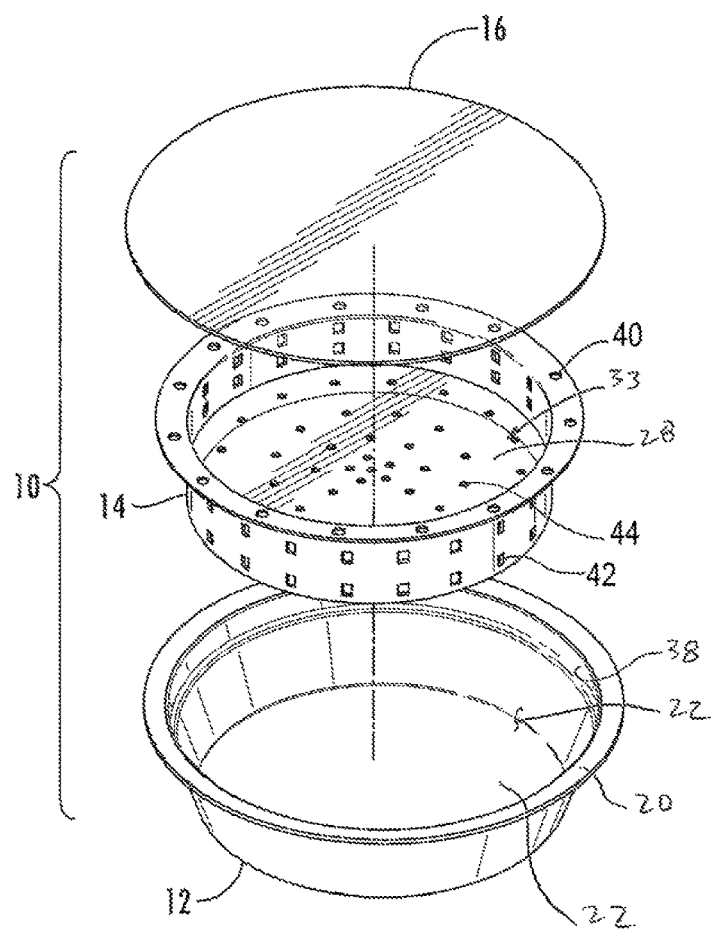

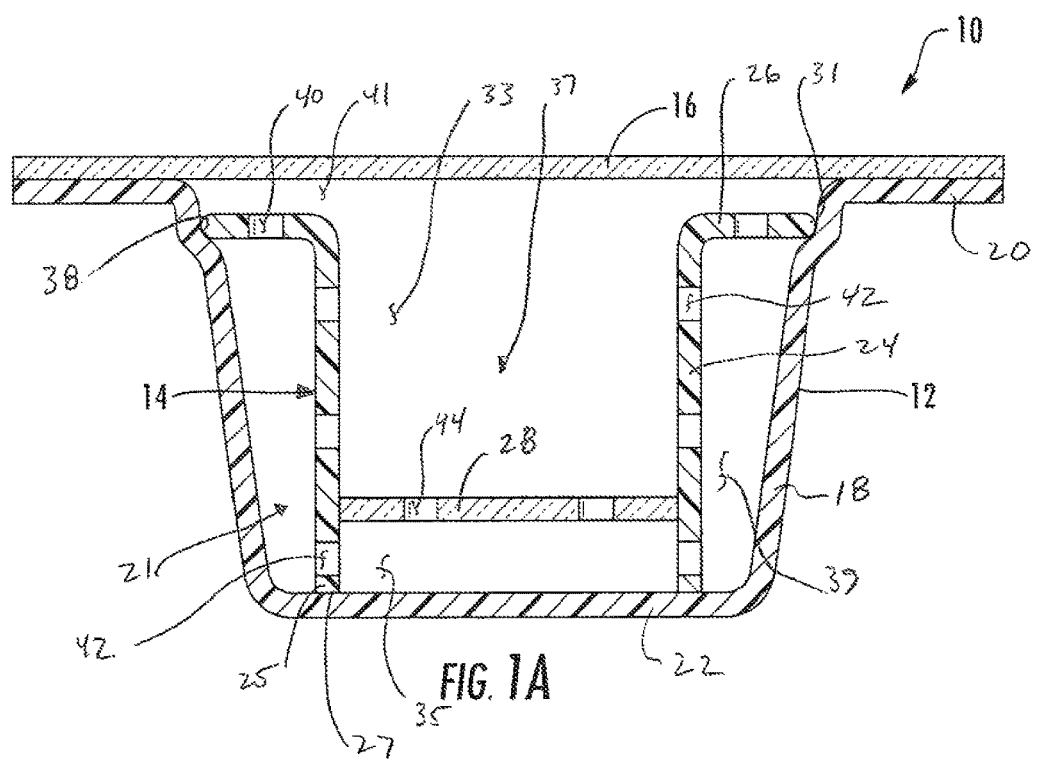

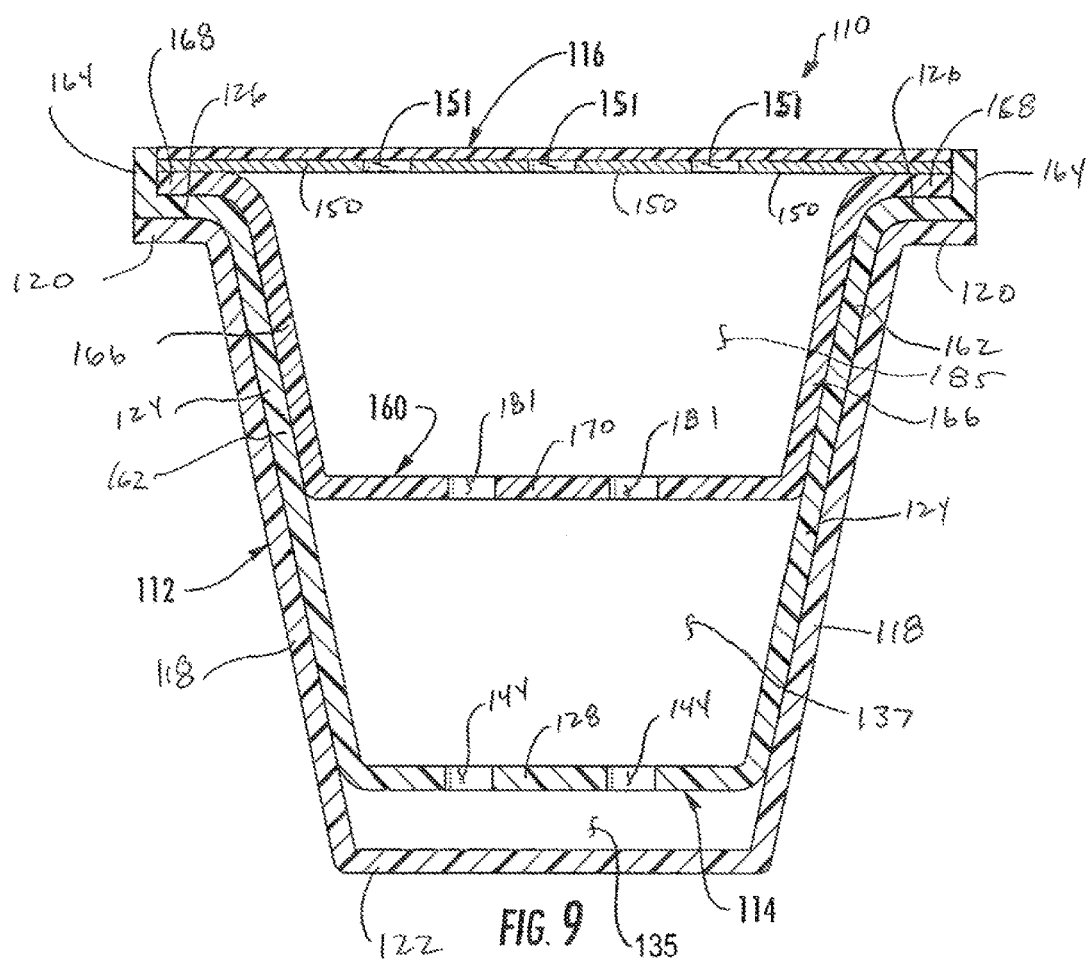

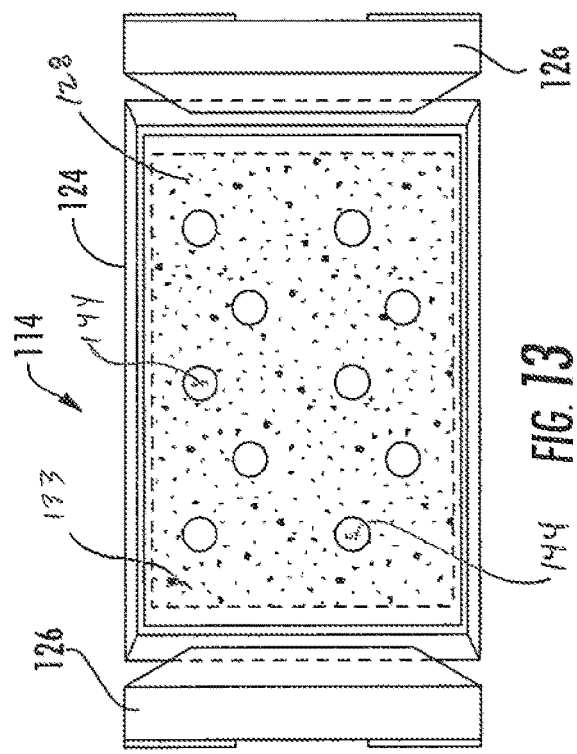
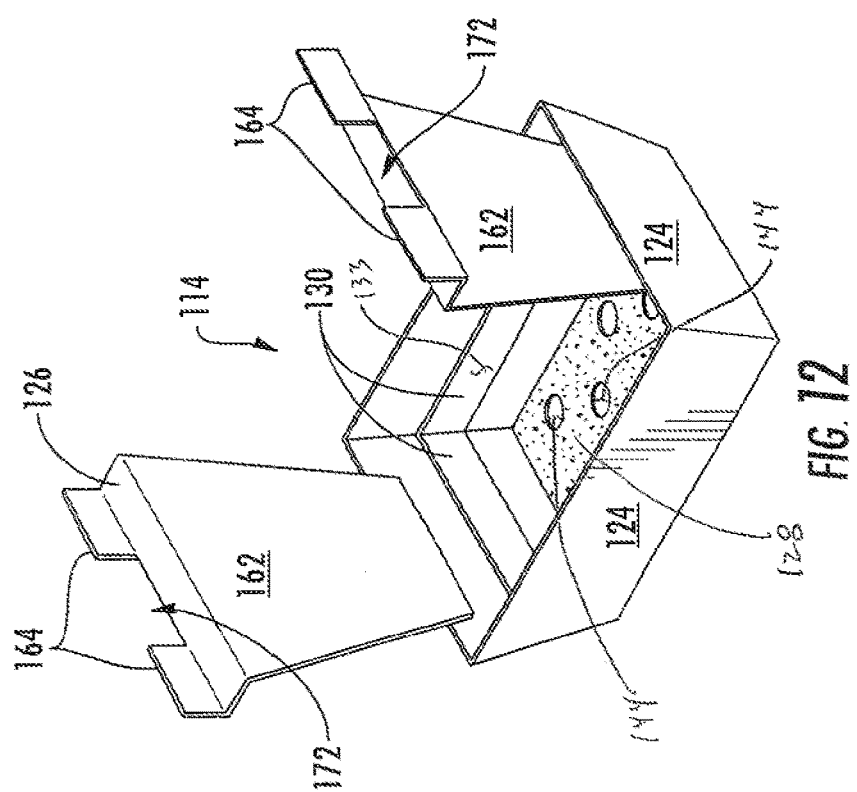

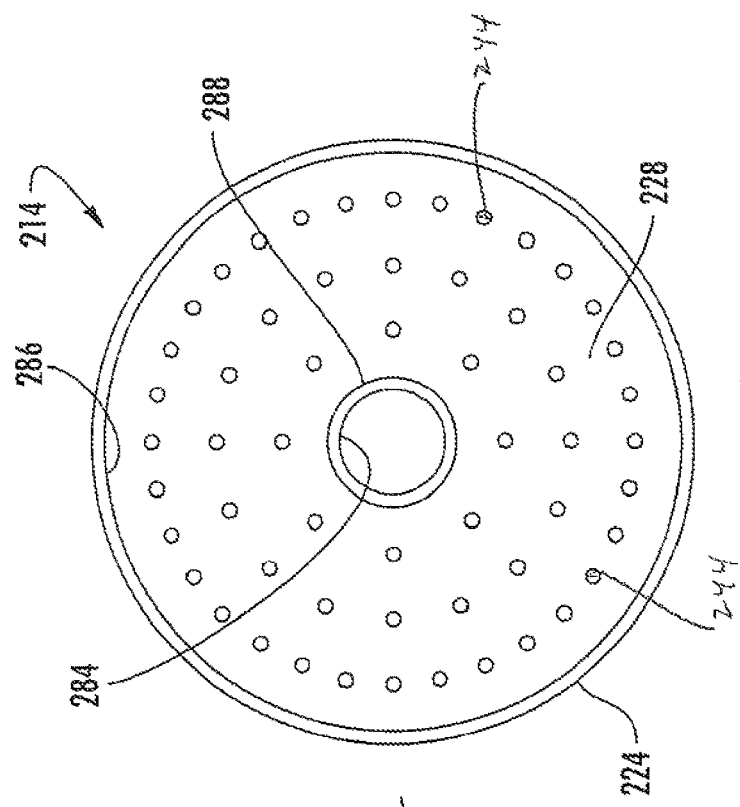
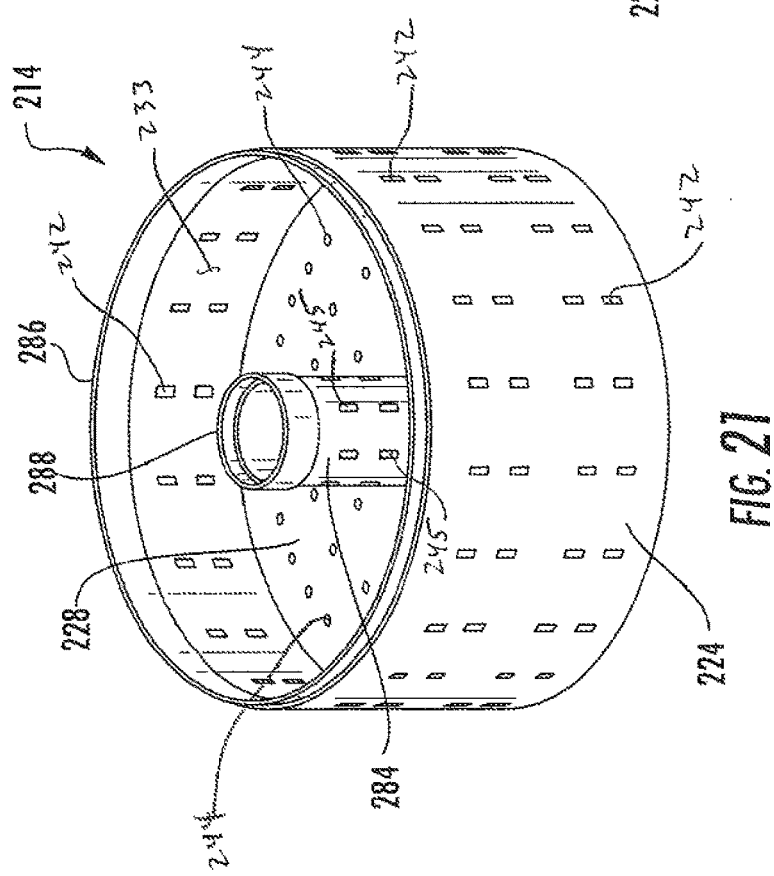

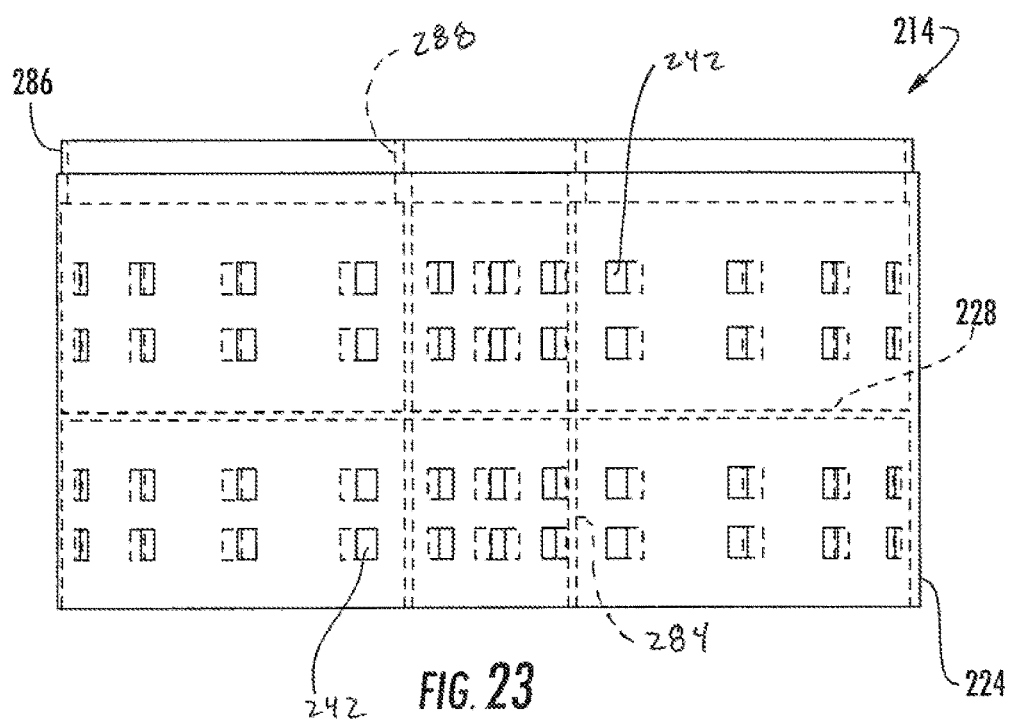

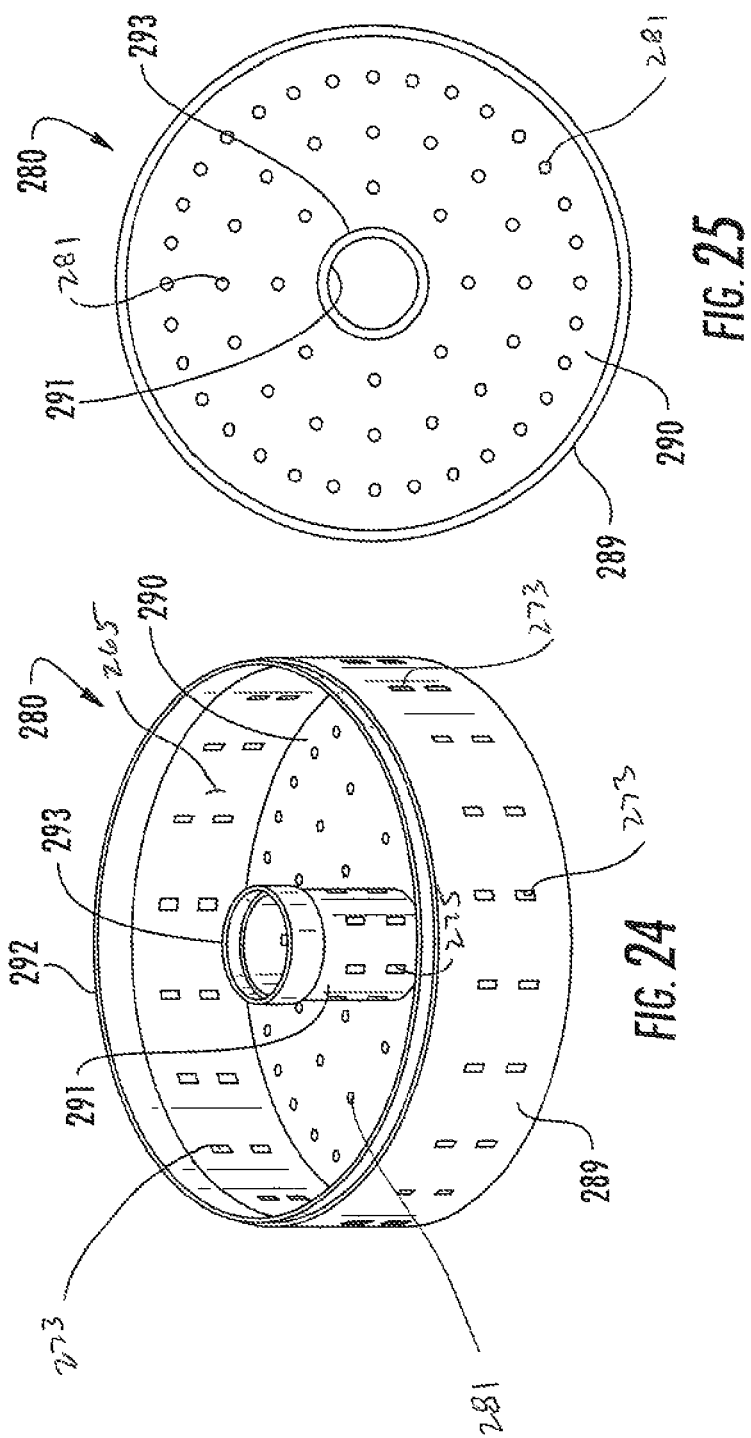

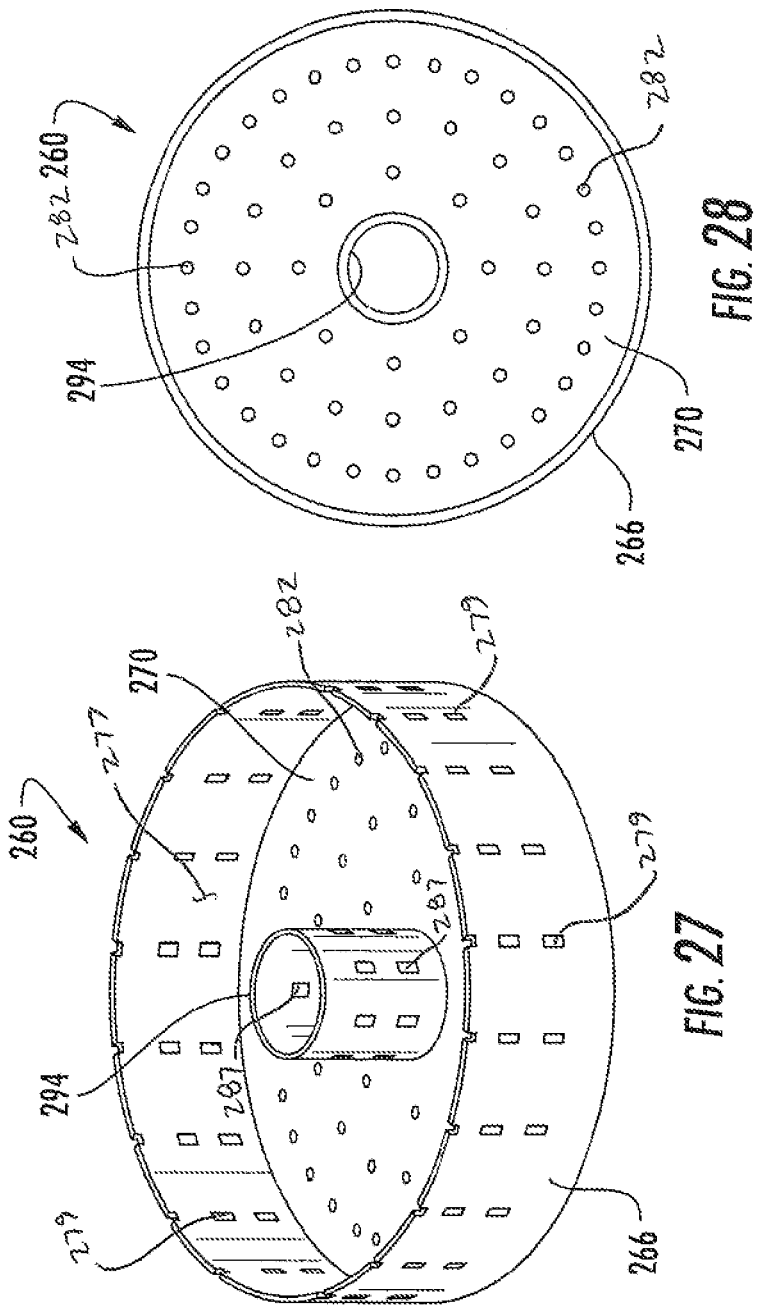

PACKAGE FOR COMBINED STEAM AND MICROWAVE HEATING OF FOOD

CROSS-REFERENCE TO RELATED APPLICATION

This application is a divisional of U.S. application Ser. No. 14/286,311, now U.S. Pat. No. 9,676,539, which was filed on May 23, 2014, which claims the benefit of U.S. Provisional Application No. 61/827,389, which was filed on May 24, 2013.

INCORPORATION BY REFERENCE

U.S. patent application Ser. No. 14/286,311, which was filed on May 23, 2014, and U.S. Provisional Application No. 61/827,389, which was filed on May 24, 2013, are hereby incorporated by reference for all purposes as if presented herein in their entirety.

FIELD OF THE DISCLOSURE

This disclosure relates to food preparation, and, more specifically, to packages that may be used to prepare foods in a microwave oven.

BACKGROUND OF DISCLOSURE

Microwave ovens commonly are used to cook food in a rapid and effective manner. To optimize the cooking performance of microwave ovens, various packaging configurations have been developed to block, enhance, direct, and otherwise affect microwave interaction with food.

SUMMARY OF DISCLOSURE

An aspect of this disclosure is the provision of a variety of packages for combined steam and microwave heating of food, wherein the packages may include microwave energy interactive materials ("MEIMs") configured for providing rapid, simultaneous microwave and steam cooking in a domestic microwave oven. The MEIMs may be configured for controlling the heating pattern within the package and to control volumetric heating of food in the package. The MEIMs may include one or more of a susceptor, shield, and/or resonating patch antenna.

An aspect of this disclosure is the provision of a relatively inexpensive, multi-sectional, at least partially separable, microwave energy-interactive package for coupled (e.g., simultaneous) microwave and steam cooking of different frozen or chilled foods in a domestic microwave oven. The package may be paper-based, or it may be manufactured of any other suitable material. One or more of the different sections of the package may comprise separate chambers respectively for the steam source and the food to be steamed, so that the steam source and the food to be steamed are separated from one another during manufacturing, storage, and cooking. The section of the package for at least partially containing the steam source may be an outer container. For example, the outer container may be in the form of a pressed bowl, folded carton, cylindrical canister, or any other suitable container. The outer container may include a susceptor and/or resonating patch antenna strategically located to induce rapid evolution of steam and/or volatile flavor from frozen/chilled water-based components.

The section of the package for at least partially containing the food to be steamed may be an inner container, and the inner container may be a basket or an assembly of baskets. For example, a basket may be in the form of a perforated pressed bowl, perforated folded carton, perforated cylindrical canister, or any other suitable container (e.g., basket). Each inner container or basket may include one or more susceptors at the surface in contact with the food, for facilitating partial browning/frying of the food while it is being steamed. The perforations, or more generally the holes, in the basket may be arranged for allowing penetration of steam into the basket at the bottom, sidewall, and/or top, such as through a head-space.

The sections of the package may be contained as one assembly having an access opening that may be covered with a paper-based and/or flexible polymeric-based lid. The lid may include MEIM in the form of, or otherwise comprising, one or more shields configured for functioning as one or more ameliorators. The partial transmission of the microwave energy due to the ameliorator(s) may allow for tempering and thawing of food, and may allow for balancing of the microwave volumetric heating effect with the convection-conduction steam heating effect.

In general, one aspect of the disclosure is directed to a package for heating a food product. The package comprising paperboard material and a microwave energy interactive material. The package comprising a first container having a first sidewall and a first bottom wall, the first sidewall and the first bottom wall cooperating to form a first interior space. A second container is received in the first interior space. The second container has a second sidewall and a second bottom wall. The second sidewall and the second bottom wall cooperating to form a second interior space. The second interior space comprising a portion of the first interior space. The second bottom wall is spaced apart from the first bottom wall to at least partially define a first compartment below the second bottom wall for receiving a first product and a second compartment above the second bottom wall for receiving a second product. The second bottom wall has at least one vent opening for allowing steam to pass from the first compartment to the second compartment.

In another aspect, the disclosure is generally directed to a method of forming a package for heating a food product. The package comprising paperboard material and microwave interactive material. The method comprising obtaining a first container having a first sidewall and a first bottom wall. The first sidewall and the first bottom wall cooperate to from a first interior space. The method comprising obtaining a second container having a second sidewall and a second bottom wall. The second sidewall and the second bottom wall cooperate to form a second interior space. The method comprise positioning the second container in the first container so that the second interior space comprises a portion of the first interior space, the second bottom wall is spaced apart from the first bottom wall to at least partially define a first compartment below the second bottom wall for receiving a first product and a second compartment above the second bottom wall for receiving a second product. The second bottom wall has at least one vent opening for allowing steam to pass from the first compartment to the second compartment.

In another aspect, the disclosure is generally directed to a package for heating a food product. The package comprising paperboard material and a microwave energy interactive material. The package comprising a first container having a first sidewall and a first bottom wall. The first sidewall and the first bottom wall cooperating to form a first interior space. A second container is received in the first interior space. The second container has a second sidewall and a second bottom wall. The second sidewall and the second bottom wall cooperate to form a second interior space. The second interior space comprising a portion of the first interior space. The second side wall has a bottom portion that is in contact with the first bottom wall and the second bottom wall is spaced above the bottom portion. The second bottom wall is spaced apart from the first bottom wall to at least partially define a first compartment below the second bottom wall for receiving a first product and a second compartment above the second bottom wall for receiving a second product. The second bottom wall has at least one vent opening for allowing steam to pass from the first compartment to the second compartment.

In another aspect, the disclosure is generally directed to a package for heating a food product. The package comprising paperboard material and a microwave energy interactive material. The package comprising a first container having a first sidewall and a first bottom wall. The first sidewall and the first bottom wall cooperating to form a first interior space. A second container is received in the first interior space. The second container having a second sidewall and a second bottom wall. The second sidewall and the second bottom wall cooperating to form a second interior space. The second interior space comprising a portion of the first interior space. A third container is received in the first interior space. The third container has a third sidewall and a third bottom wall. The third sidewall and the third bottom wall cooperate to form a third interior space. The third interior space comprising a portion of the first interior space. The second bottom wall is spaced apart from the first bottom wall to at least partially define a first compartment below the second bottom wall for receiving a first product and a second compartment above the second bottom wall for receiving a second product. The third bottom wall is spaced apart from the second bottom wall to at least partially define a third compartment above the third bottom wall for receiving a third product. The second bottom wall has at least one vent opening for allowing steam to pass from the first compartment to the second compartment and the third bottom wall has at least one vent opening for allowing steam to pass from the second compartment to the third compartment.

In another aspect, the disclosure is generally directed to a package for heating a food product. The package comprising paperboard material and a microwave energy interactive material. The package comprising a first container having a first sidewall and a first bottom wall. The first sidewall and the first bottom wall cooperating to form a first interior space. The first bottom wall comprising a first support on the first bottom wall. A second container is received in the first interior space. The second container has a second sidewall and a second bottom wall. The second sidewall and the second bottom wall cooperate to form a second interior space. The second interior space comprising a portion of the first interior space. The second side wall has a bottom portion that is in contact with the first support and the second bottom wall is spaced above the bottom portion. The second bottom wall is spaced apart from the first bottom wall to at least partially define a first compartment below the second bottom wall for receiving a first product and a second compartment above the second bottom wall for receiving a second product. The second bottom wall having at least one vent opening for allowing steam to pass from the first compartment to the second compartment.

In another aspect, the disclosure is generally directed to a method of heating a food product in a package in a microwave oven. The method comprising obtaining a first container having a first sidewall and a first bottom wall. The first sidewall and the first bottom wall cooperating to form a first interior space. The method comprises obtaining a second container having a second sidewall and a second bottom wall. The second sidewall and the second bottom wall cooperating to form a second interior space. The second bottom wall having at least one vent opening. The method comprises positioning the second container in the first interior space so that the second interior space comprises a portion of the first interior space and the second bottom wall is spaced apart from the first bottom wall to form a first compartment below the second bottom wall and a second compartment above the second bottom wall. The method comprises placing a source of steam in the first compartment so that the source of steam is supported by the first bottom wall, placing a food product in the second compartment so that the food product is supported by the second bottom wall, and heating the package in a microwave oven so that steam is created in the first compartment and circulates to the second compartment through the vent openings in the second bottom wall so that the food product is heated by the steam and microwave energy.

The foregoing presents a simplified summary of some aspects of this disclosure in order to provide a basic understanding. The foregoing summary is not an extensive summary of the disclosure and is not intended to identify key or critical elements of the disclosure or to delineate the scope of the disclosure. The purpose of the foregoing summary is to present some concepts of this disclosure in a simplified form as a prelude to the more detailed description that is presented later. For example, other aspects will become apparent from the following.

BRIEF DESCRIPTION OF THE DRAWINGS

Having described some aspects of this disclosure in general terms, reference will now be made to the accompanying drawings, which are not necessarily drawn to scale. The drawings are exemplary only, and should not be construed as limiting the disclosure.

FIG. 1 is a perspective view of a package in a fully assembled, closed configuration, in accordance with a first embodiment of this disclosure.

FIG. 1A is a cross-sectional view of the package of FIG. 1.

FIG. 2 is an exploded view of the package of FIG. 1.

FIG. 9 is a schematic, cross-sectional view of the assembled package of FIG. 8.

FIG. 12 is a perspective view of a second container of the package of FIG. 8.

FIG. 13 is a top view of the second container of FIG. 12.

FIG. 21 is a perspective view of a second container of the package of FIG. 16.

FIG. 22 is a schematic, top view of the second container of FIG. 21.

FIG. 23 is a schematic, side elevation view of the second container of FIG. 21.

FIG. 24 is a perspective view of a third container of the package of FIG. 16.

FIG. 25 is a schematic, top view of the third container of FIG. 24.

FIG. 27 is a perspective view of a fourth container of the package of FIG. 16.

FIG. 28 is a schematic, top view of the fourth container of FIG. 27.

DETAILED DESCRIPTION OF THE EXEMPLARY EMBODIMENTS

Figure 3:
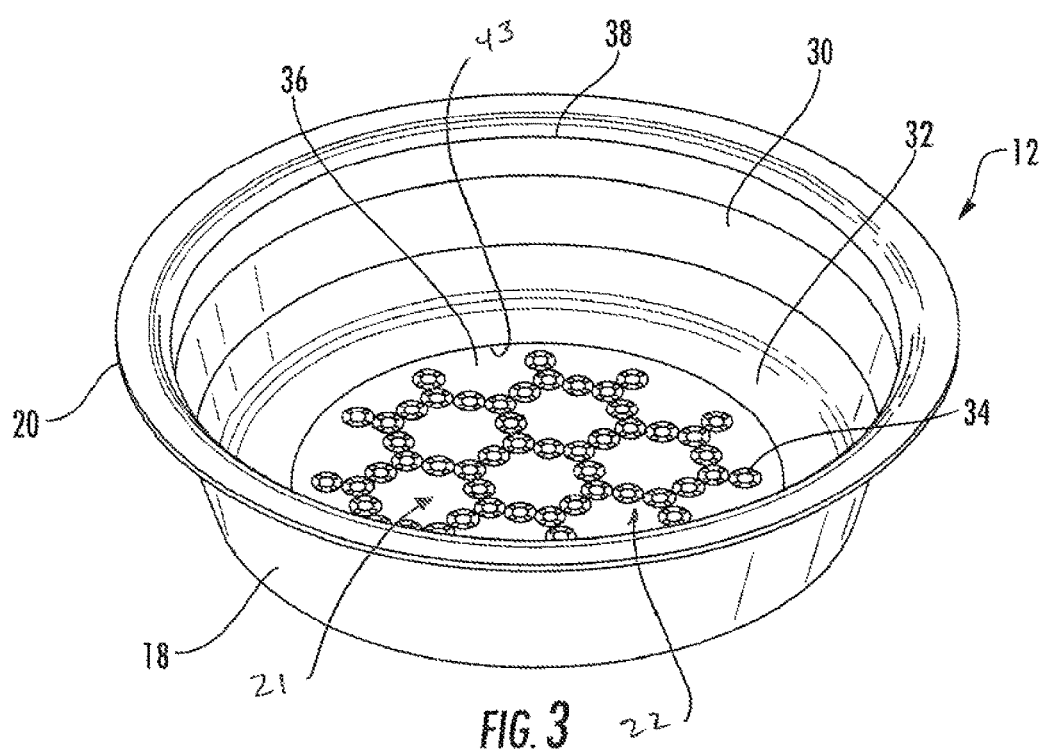
FIG. 3 is a perspective view of a first container of the package of FIG. 1

Exemplary embodiments of this disclosure are described below and illustrated in the accompanying figures, in which like numerals refer to like parts throughout the several views. The embodiments described provide examples and should not be interpreted as limiting the scope of the disclosure. Other embodiments, and modifications and improvements of the described embodiments, will occur to those skilled in the art and all such other embodiments, modifications and improvements are within the scope of the present disclosure.

Referring now in greater detail to the drawings, FIGS. 1 and 2 illustrate an apparatus, or more specifically a package 10, that may be used for combined steam and microwave heating of food (not shown) in a domestic microwave oven, in accordance with a first embodiment of this disclosure. The package 10 is shown in its fully assembled (e.g., closed) configuration in FIGS. 1 and 1A, and in an exploded configuration in FIG. 2.

The package 10 includes an outer (first) container 12 that, in isolation, is upwardly open and may be in the form of a pressed bowl 12, or the like. The package 10 further includes at least one inner (second) container 14 that, in isolation, is upwardly open and may be at least partially in the form of a concentric cylinder. The inner container 14 typically has a plurality, or more specifically a multiplicity, of holes or vent openings 40, 42, 44, extending there through. Accordingly, the inner container 14 may be referred to as a basket 14. More generally and in accordance with one aspect of this disclosure, a basket, such as the basket 14, may be more generally referred to as a container having a plurality and/or multiplicity of holes extending there through, or the like. In one embodiment, the package 10 further includes a cover 16 that is shown in FIG. 1 as being transparent or translucent, so that a user may see through the cover. Alternatively, the cover may be opaque (e.g., impenetrable by light), or in any other suitable configuration.

The outer container 12 may be formed by pressing and, thus, may be referred to as a pressed bowl. For example, the outer container 12 may be a bowl formed by press-forming paperboard that may be coated and/or laminated with one or more other materials. Alternatively, the bowl 12 may be configured/formed in any other suitable manner from any other suitable materials. The main body of the inner container 14 may be cylindrical and may fit concentrically in the bowl 12, although the basket may be configured differently. The basket 14 may be constructed similarly to the bowl 12, or in any other suitable manner. The cover 16 may be a flat, thin, flexible, plastic film cover, although the cover may be configured in any other suitable manner.

As shown in FIGS. 1A and 3, the first container 12 is an upwardly open bowl that may has a frustoconical sidewall 18 and an annular flange 20 extending outwardly from the upper annular edge of the sidewall. The bowl 12 typically further includes a disk-shaped bottom wall 22 extending inwardly from the lower annular edge of the sidewall, so that the bowl is downwardly closed. In one embodiment, the bottom wall 22 and the sidewall 18 cooperate to form a first interior space 21. As shown in FIGS. 1A and 3, the sidewall 18 has an indentation or annular lip 38 on the inner surface of the sidewall spaced below the flange 20. The first container could be otherwise shaped, arranged, and/or configured without departing from the disclosure.

Figure 4:
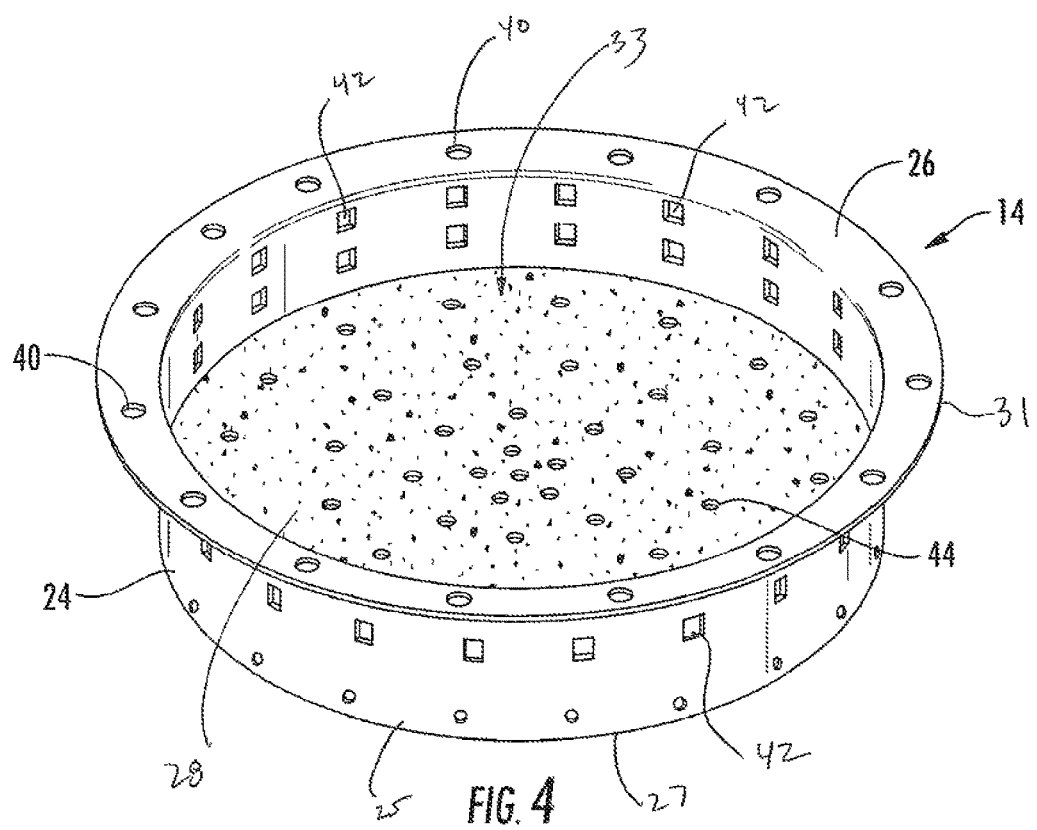
FIG. 4 is a perspective view of a second container of the package of FIG. 1.
Figure 5:
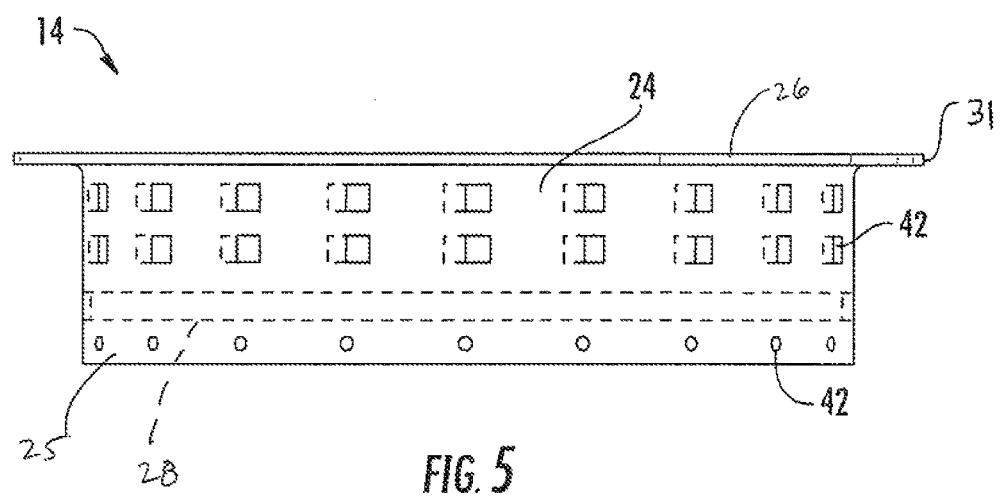
FIG. 5 is a schematic, side elevation view of the second container of FIG. 4.

As shown in FIGS. 4 and 5, the second container 14 is an upwardly open basket 14 that has a cylindrical sidewall 24, an annular flange 26 extending outwardly from the upper annular edge of the sidewall 24, and a disk-shaped bottom wall 28. The bottom wall 28 extends inwardly from an annular portion of the inner surface of the sidewall 24, wherein this annular portion of the inner surface of the sidewall 24 is positioned between, and distant from each of, the upper and lower annular edges of the sidewall 24. That is, the sidewall 24 has a bottom portion 25 that extends below the bottom wall 28 and contacts the bottom wall 22 of the first container 14. As a result, the bottom wall 28 divides the interior of the basket 14 into upper portion above the bottom wall and a lower portion below the bottom wall. In one embodiment, a plurality of vent openings 40 (e.g., perforations or holes) extends through flange 26 of the second container 14, a plurality of vent openings 42 extends through the sidewall 24, and a plurality of vent openings 44 extends through the bottom wall 28. Each of the vent openings 40, 42, 44 is configured for allowing steam to pass there through, as will be discussed in greater detail below.

In the first embodiment, the basket 14 may fit concentrically in the bowl 12, wherein the lower annular edge 27 of the lower portion 25 of the second container 14 engages and is supported by the bottom wall 22 of the first container 12. Also, the outer annular edge 31 of the flange 26 of the second container 14 engages the annular lip or engaging feature of the sidewall 18 of the first container 12. As such, the height of the first container 12 is larger than the height of the second container 14 so that the flange 26 of the second container is spaced below the flange 20 of the first container. As a result, when the second container 14 is installed in the first container 12, a "head-space" is defined above the basket's flange 26 and the basket's upper chamber. That is, when the basket 14 is positioned in the bowl 12 such that the basket and bowl are assembled together, the basket's flange 26 extends in a plane positioned below the bowl's flange 20, so that a gap is defined between the basket's flange 26 and the cover 16, and the head-space comprises this gap. In the fully assembled configuration of the package 10, the head-space is positioned above, and fully open to, the basket's upper chamber. The head-space is for allowing steam to pass therethrough, as will be discussed in greater detail below.

In the assembled package 10 of one embodiment, the second container 14 is received in the firs interior space 21 of the first container 12 so that the lower annular edge 27 of the sidewall 24 of the basket 14 is engaging and being supported by the bottom wall 22 of the first container 12. The sidewall 24 and the bottom wall 28 of the second container 14 cooperate to form a second interior space 33 above the bottom wall that comprises a portion of the first interior space 21. Also, the second container 14 defines a first compartment 35 of the package 10 below the bottom wall 28 of the first container and between the lower portion 25 of the annular sidewall 24. A second compartment 37 of the package 10 is above the bottom wall 28 and between the portions of the annular sidewall 24 above the bottom wall 28. In one embodiment, the package comprises a third compartment 39 in the annular space between the sidewalls 24, 18 and below the flange 26. The flange lower portion of the sidewall 24 engaging the bottom wall 22 of the first container 12 may form a support structure for supporting the second compartment 37 above the first compartment 35. The support structure of the basket 14 may be replaced with any other suitable support structure. Also, the flange 26 and the bottom portion 25 of the sidewall 24 are locating features for locating the second container 14 in the interior space 21 of the first container 12.

In the fully assembled configuration of the package 10, an annular side chamber or third compartment 39 is defined between the sidewalls 18, 24 as a result, for example, of these sidewalls having different diameters. The head-space 41 above the flange 26 and the side chamber 39 are areas for receiving steam and allowing the steam to circulate therein, as will be discussed in greater detail below.

An example of a method of using the package 10 in accordance with the first embodiment is described in the following. In this regard, a source of steam is typically placed in the first container 12, so that the steam source (not shown) is positioned on the bottom wall 22 of the first container and located in the first compartment 35 of the package 10. The steam source is typically frozen food and/or immobilized high moisture content food grade material such as, but not limited to, frozen water (i.e., ice), although other suitable steam sources may be used.

Frozen/refrigerated food (i.e., food product not shown) to be steamed is typically placed in the second compartment of the package 10 so that the food product is supported on the bottom panel 28 of the second container 14. When the basket 14 is positioned in the bowl 12 such that the basket and bowl are assembled together as discussed above, the basket's bottom wall 28, which supports the food to be steamed, is elevated above the bowl's bottom wall 22 and is typically elevated at least slightly above the steam source so that enough vertical space is provided between steam source and the food to be steamed for steam circulation between steam source and the food to be steamed. While the package 10 is in the fully assembled (e.g., closed) configuration of FIG. 1, it is configured for allowing for circulation of steam at the bottom, side, and top of the food to be steamed, for efficient and substantially even steaming of the food to be steamed. More specifically, the vertical space between steam source and the food to be steamed, the above-discussed head-space 41, and the above-discussed side chamber 39 are cooperative for allowing for circulation of steam within the second compartment 37, at the bottom, side, and top of the food to be steamed, for efficient and substantially even steaming of the food to be steamed.

In the fully assembled (e.g., closed) configuration of the package 10 shown in FIG. 1, the annular margin of the cover 16 may be fixedly, selectively removably mounted to the bowl's flange 20 for closing (e.g., hermetically sealing closed) the upper opening of the first container 12 and at least partially defining the interior space of the first container. The cover 16 may be mounted in this location by way of adhesive material or other suitable fastening features, or more specifically by a heat seal comprising thermoplastic material. Such a fully assembled package 10 may contain contents, such as the steam source and the food to be steamed in the basket's lower and upper chambers, respectively. In one example, such content-laden, fully assembled packages 10 may be contained in grocery store freezers, or any other suitable locations, for being purchased by consumers, although the packages 10 may be commercialized and/or used in any other suitable manner A content-laden, fully assembled package 10 may be placed in a microwave oven and exposed to microwave energy therein. In response to the content-laden, fully assembled package 10 being exposed to the microwave energy in the microwave oven, the contents within the package 10 may be heated, such that steam is generated and circulates within the package as discussed above, and as will be discussed in greater detail below. Preferably (e.g., optionally) the packages include one or more microwave energy interactive materials ("MEIMs") configured for providing rapid, simultaneous microwave and steam cooking in the microwave oven. The MEIMs may be configured for controlling the heating pattern within the package and to control volumetric heating of the food in the package. The MEIMs may include one or more of a susceptor, shield, and/or resonating patch antenna. MEIMs and other features of the package 10 are discussed in greater detail below, in accordance with the first embodiment.

Referring back to FIG. 3, MEIM in the form of a frustoconical, upper shield 30 is mounted to, and concentric with, the sidewall 18. The upper shield 30 is configured for deflecting (e.g., reflecting) incident microwave energy in a manner for resulting in a relatively increased microwave energy field at the bottom of the first container 12. The upper shield 30 is configured for controlling distribution of the microwave energy, for relatively increasing the amount of microwave energy that is directed to/incident upon the stream source located in the bottom of the first container 12, within the first compartment 35 of the package 10. The resulting, relatively high concentration of the microwave energy field at the bottom of the first container 12 aids in faster heating of steam source. The upper shield 30 may be a MicroRite® shield, or any other suitable MEIM.

Concentrically mounted to the upper surface of the bottom wall 22 is MEIM in the form of at least one lower shield 32. The lower shield 32 is disk-shaped and has an inner edge 43 defining a central opening. The lower shield 32 is configured for deflecting (e.g., reflecting) incident microwave energy in a manner for lessening an edge heating effect in a manner that seeks to prevent burning of the material (e.g., paperboard) of the bowl 12 proximate the outer peripheral edge of the bottom wall 22 and the lower annular edge of the sidewall 24. The lower shield 32 may be a MicroRite® shield 32, or any other suitable MEIM.

MEIM in the form of at least one antenna pattern 34 is concentrically positioned in the central hole of the lower shield 32, and mounted to the upper surface of the bottom wall 22. The antenna 34 is configured for routing at least some of the microwave energy in a manner for resulting in an increased microwave energy field at the bottom of the bowl 12. The antenna 34 is configured for controlling distribution of the microwave energy, for increasing the amount of microwave energy that is directed to/incident upon the stream source located in the bottom of the first container 12, within the first compartment 35 of the package 10. The resulting, relatively high concentration of the microwave energy field at the bottom of the bowl 12 aids in faster heating of the steam source. In one example, the antenna 34 is configured for resonating at, substantially at, and/or approximately at 2450 MHz. The antenna 34 may be a MicroRite® antenna, or any other suitable MEIM.

MEIM in the form of at least one susceptor 36 is concentrically positioned in the central hole of the lower shield 32, and mounted to the portion of the upper surface of the bottom wall 22 at which the lower shield 32 and antenna pattern 34 are not present. The MEIMs 32, 34, 36 typically are discontiguous with one another such that gaps are provided therebetween. The susceptor 36 absorbs microwave energy, and the susceptor becomes hot and provides heat energy in response its absorption of microwave energy. For example, as the susceptor 36 heats up by absorbing microwave energy, heat energy is conducted from the susceptor to the steam source that may be in direct contact with, or indirect contact with, the susceptor 36. In addition, the stream source is typically further heated by the microwave energy incident upon the stream source. The susceptor 36 may be a MicroRite® susceptor, or any other suitable MEIM. Typically (e.g., optionally) the MEIMs 30, 32, 34, 36 will be positioned between the inner surface of the base material of the bowl 12 and a polymeric film of the bowl, or the like, as will be discussed in greater detail below.

As noted above, in one embodiment, the annular engaging feature 38 (FIG. 3), such as a lip, shoulder, groove and/or other suitable feature, may be defined by or otherwise provided at the bowl's sidewall 18. The outer annular edge 31 of the basket's flange 26 engages against the engaging feature 38 of the sidewall 18 in the assembled configuration of the package 10. This engagement may seek to locate and hold the basket's flange 26, and thus the basket 14, in its concentric position in the bowl 12, for restricting relative movement between the basket and the bowl in a manner that maintains the above-described head-space.

The engagement between the outer annular edge 31 of the flange 26 and the engaging feature 38 may be in the form of an interference fit, such as a relatively loose or a relatively tight interference fit, or it may be in the form of any other suitable engagement, connection, or the like. For example, when it is intended for the second container 14 to be removed from the first container 12, any engagement or connection between the outer annular edge 31 of the flange 26 and the engaging feature 38 would typically be loose enough to allow a user to readily manually remove the basket from the bowl. On the other hand, alternatively the outer annular edge 31 of the flange 26 and the engaging feature 38 may be fixedly connected to one another and/or other features may be provided for restricting removal of the second container 14 from the first container 12, such as when the steam source is not a food product and is not intended to be accessed. Irrespective, in the first embodiment, the connection (e.g., interference fit) between the outer annular edge 31 of the flange 26 and the engaging feature 38 is typically strong enough so that the package 10 is intended to remain in its fully assembled configuration during shipping, handling and at least some of the use of the package 10. In the fully assembled configuration of the package 10, the lower annular edge 27 of the sidewall 24 of the second container 14 remains engaged against the bottom wall 22 of the first container, and the head-space remains defined above the upper chamber of the basket 14. That is, the connection between the outer annular edge 31 of the flange 26 and the engaging feature 38 seeks to restrict any undesired relative movement between the first container 12 and the second container 14 while they are in the assembled configuration.

Referring back to FIGS. 1A, 4, and 5, the series of holes 40 extending through the flange 26 are for allowing steam to flow, for example, from the side chamber 39, which is defined between the sidewalls 18, 24, to the head-space 41. The series of holes 42 extending through the sidewall 24 are for allowing steam to flow, for example, from the side chamber 39, which is defined between the sidewalls 18, 24, to the upper chamber (second compartment) of the package 10. The series of holes 44 extending through the bottom wall 28 of the second container 14 are for allowing steam to flow, for example, from the first compartment 35 of the package 10 to the second compartment 37 of the package.

As schematically illustrated by stippling in FIG. 4, MEIM in the form of at least one susceptor may be mounted to and carried by the upper surface of the bottom wall 28 of the second container 14, typically without obstructing the holes 44 in the bottom wall. The one or more susceptors of the upper surface of the bottom wall 28 absorbs microwave energy so as to become hot and provide heat energy to the food to be steamed, which is placed on the bottom wall and located in the second compartment 37 of the package. In one example, the food to be steamed is in contact with the susceptor of the bottom wall (e.g., supported by a polymeric film, or the like, of the bottom wall susceptor). As the susceptor of the bottom wall 28 heats up, at least partial browning and/or frying (e.g., if the bottom wall's susceptor is coated with and/or in contact with oil) is induce at the lower surface of the food being streamed.

Figure 6:
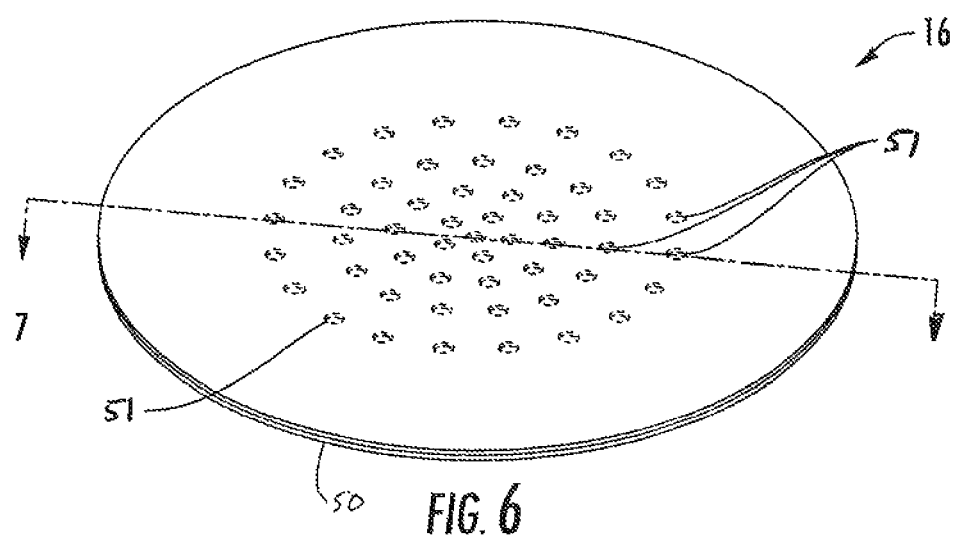
FIG. 6 is a perspective view of a cover for use with the package of FIG. 1.
Figure 7:
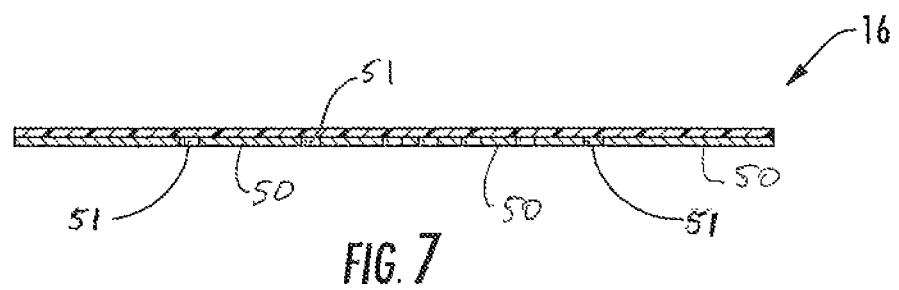
FIG. 7 is a cross-sectional view of the cover of FIG. 6.

The cover 16, which may be a plastic film, is shown in isolation in FIGS. 6 and 7. MEIM in the form of one or more top shields 50 may be mounted to the lower surface of the cover 16, or in any other suitable location, like on the upper surface of the cover. The top shields 50 may comprise one or more patches of aluminum foil, or the like, configured for operating as one or more ameliorators. As one example, the ameliorator(s) may be formed by etching away portion(s) of the one or more patches of aluminum foil shielding material mounted to the cover 16 to form openings or voids 51 in the aluminum foil. The etching may be performed at predetermined (e.g., strategic) locations to create the voids 51 in the top shield 50 for allowing partial transmission of microwave energy through the cover 16 to the food being steamed. That is, the ameliorator(s) are configured for controlling penetration of microwave energy (from above) through the cover 16 to the food to be steamed. The partial transmission of the microwave energy provided by the ameliorator(s) seeks to allow for tempering and thawing of food being steamed, and seeks to allow for balancing of the microwave volumetric heating effect with the convection-conduction steam heating effect. Of course, the thawing feature is present only when the food being steamed is frozen. Reiterating from above, inclusion of the ameliorator/top shields 50 may be advantageous because, without it, volumetric heating of the food being steamed through microwave energy penetration may be faster than the convection-conduction heating provided by way of the steam. Therefore, to allow sufficient steaming time, the ameliorating top shields 50 reduce microwave energy transmission from the top thereby balancing with the rate of volumetric heating. In the first embodiment, the ameliorator patches or top shields 50 are mostly concentrated at the center of the cover 16 in a manner that seeks not to interfere too much with transmission of the microwave energy transmission toward the bottom of the bowl 12, wherein the transmission of the microwave energy toward the bottom of the bowl advantageously seeks to provide for rapid production of steam, as discussed in greater detail above. The cover 16 and shields 50 could be otherwise shaped, arranged, and/or configured and the shields 50 could be omitted or otherwise configured without departing from the disclosure.

A second embodiment of this disclosure is like the first embodiment, except for variations noted and variations that will be apparent to one of ordinary skill in the art. Due to the similarity, components of the second embodiment that are identical, similar and/or function in at least some ways similarly to corresponding components of the first embodiment have reference numbers incremented by 100.

Figure 8:
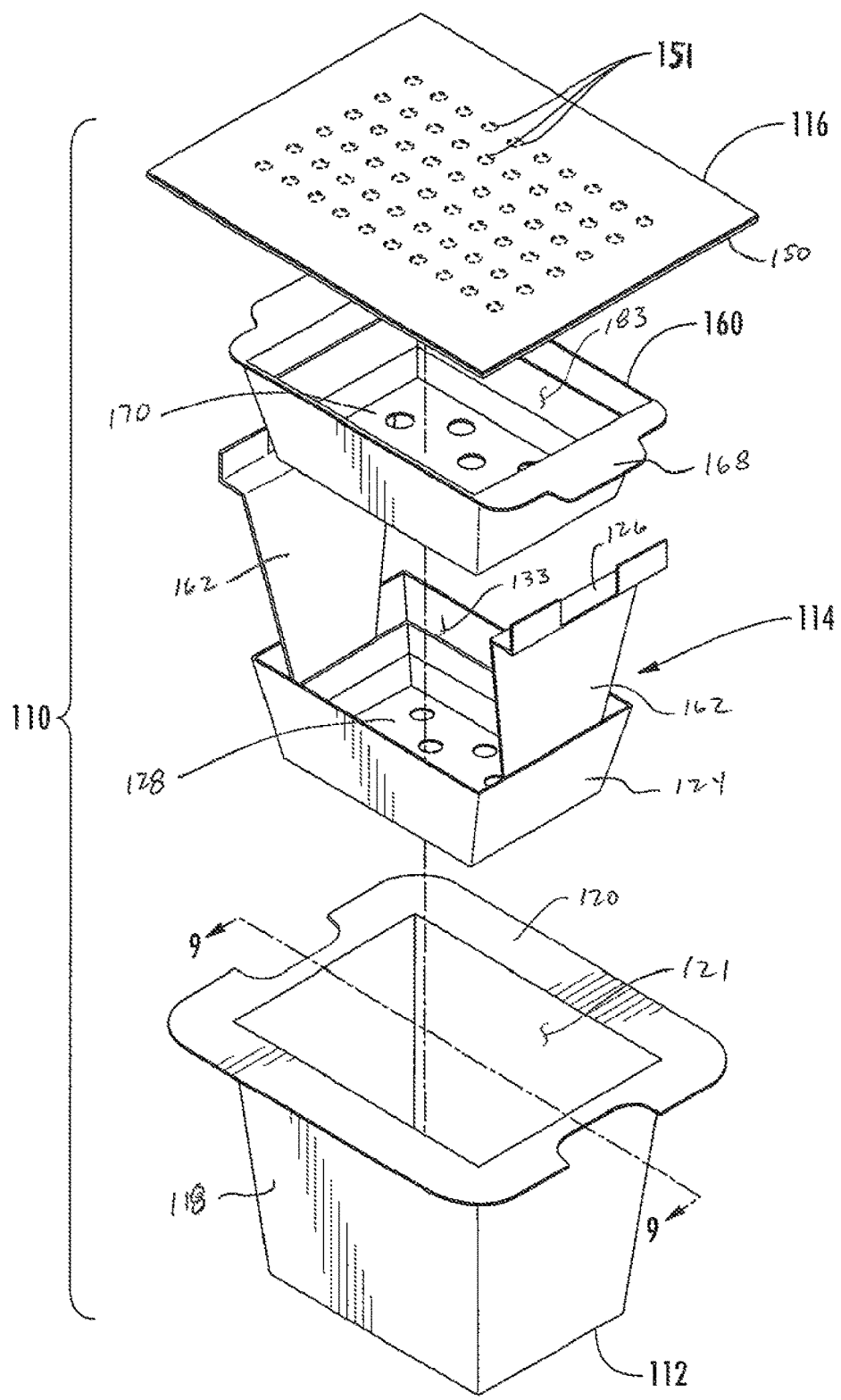
FIG. 8 is an exploded view of a package of a second embodiment of the disclosure.

FIGS. 8 and 9 illustrates an apparatus, or more specifically a package 110, that may be used for combined steam and microwave heating of food in a domestic microwave oven, in accordance with the second embodiment. The package 110 may comprise one or more folded paperboard containers or cartons 112, 114, 160, although these features may be any other suitable structures.

Figure 14:
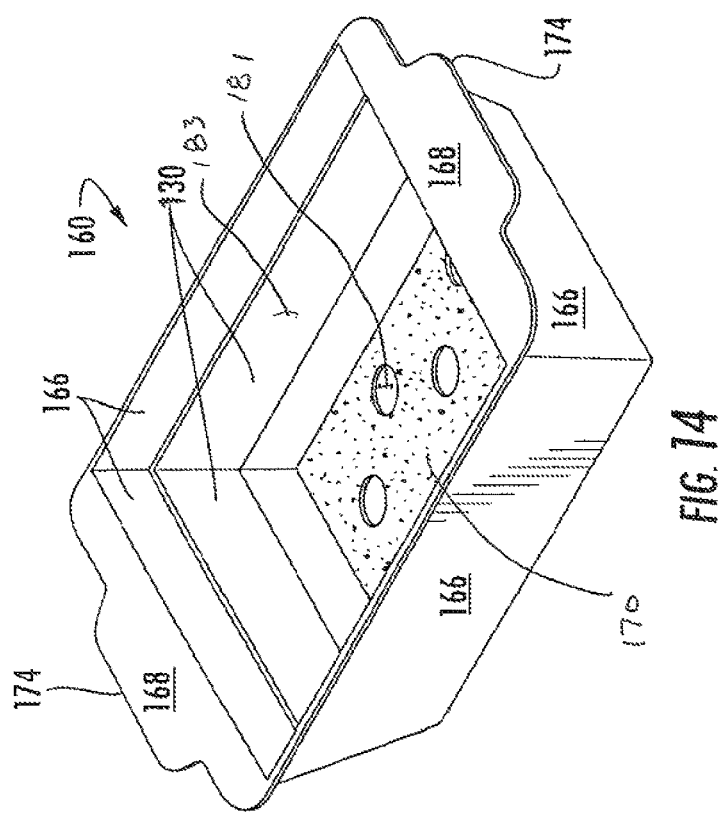
FIG. 14 is a perspective view a third container of the package of FIG. 8.

The package 110 includes an outer (first) container 112 that, in isolation, is upwardly open may be in the form of a box 112. The package 110 further includes at least one inner (second) container 114 that, in isolation, is upwardly open. The inner container 114 may be referred to as a lower basket 114. Optionally, the package 110 further includes a second inner (third) container 160 that, in isolation, is upwardly open. The third container 160 may be referred to as an upper basket 160. The baskets 114, 116 may be referred to together as a composite or multipart basket. The package 110 further includes a cover 116 that is shown in FIG. 14 as being transparent or translucent, so that a user may see through the cover. Alternatively, the cover may be opaque (e.g., impenetrable by light), or in any other suitable configuration.

The first container 112 may be formed by erecting a blank comprising paperboard and, thus, may be referred to as a folded carton box; although the box 112 may be formed from any other suitable materials and/or the box may be constructed/configured in any other suitable manner. Each of the baskets 114, 160 may also be formed by erecting a blank comprising paperboard, and the baskets may fit concentrically in the box 112 and with respect to one another in a nested configuration, although the box and baskets may be configured differently. The cover 116 may be a flat, thin, flexible, plastic film cover, although the cover may be configured differently.

Figure 11:
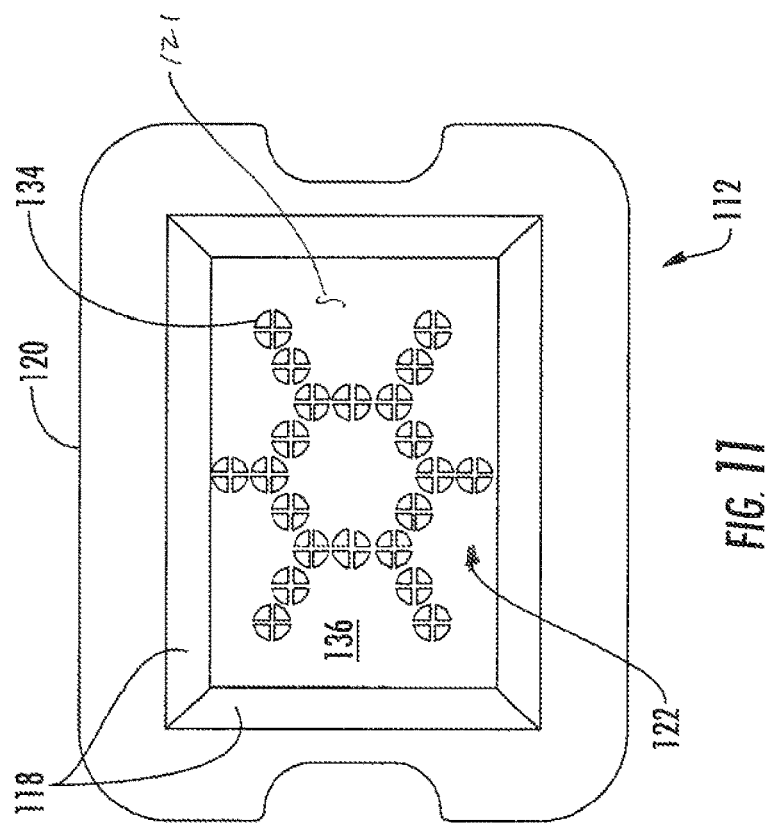
FIG. 11 is a top view of the first container of FIG. 10.
Figure 10:
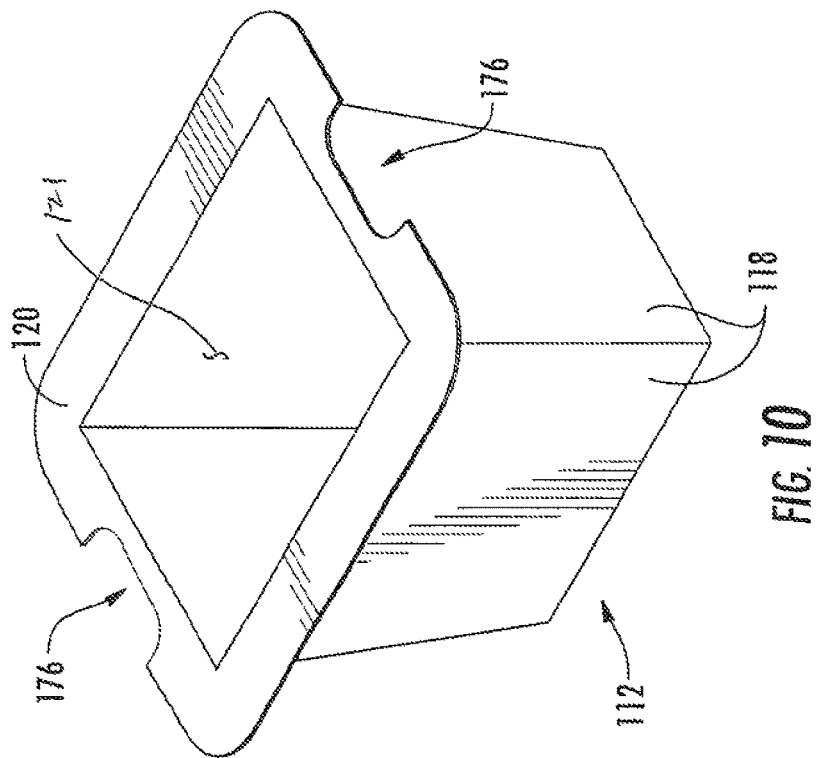
FIG. 10 is a perspective view of a first container of the package of FIG. 8.

The first container 112 is shown in isolation in FIGS. 10 and 11. The upwardly open box 112 may have a frusto-pyramidal assembly of the sidewalls ("sidewall 118"), an assembly of flanges ("flange 120") extending outwardly from the upper edge of the sidewall, and a rectangular bottom wall 122 extending inwardly from the lower edge of the sidewall, so that the box is downwardly closed. MEIM in the form of at least one antenna pattern 134 (FIG. 11) is centrally mounted to the upper surface of the bottom wall 122. The antenna 134 may be substantially like the antenna 34 discussed above, or this MEIM may be in any other suitable configuration. MEIM in the form of at least one susceptor 136 is mounted to the portion of the upper surface of the bottom wall 122 at which the antenna pattern 134 is not present, except that the MEIMs 134, 136 are typically discontiguous with one another such that gaps are provided therebetween. The susceptor 136 may be substantially like the susceptor 36 discussed above, or this MEIM may be in any other suitable configuration. The sidewalls 118 and bottom wall 122 cooperate to form a first container space 121. The first container 112 could be otherwise shaped, arranged, and/or configured without departing from the disclosure.

The second container 114 is shown in isolation in FIGS. 12 and 13. The upwardly open lower basket 114 may have a frusto-pyramidal assembly of the sidewalls ("sidewall 124") that include suspension arms 162 connected extending upwardly from opposite portions of the sidewall 124, flanges 126 extending outwardly from upper ends of the suspension arms, flange extensions 164 extending (e.g., upwardly in FIG. 12) from outer ends of the flanges 126, and a rectangular bottom wall 128 extending inwardly from the lower periphery of the sidewall 124. The sidewall 124 and the bottom wall 128 of the second container 114 cooperate to form a second interior space 133. A plurality of vent openings 144 (e.g., holes or perforations) extends through the bottom wall 128 of the lower basket 114. Each of the holes 144 in the bottom wall 128 of the lower basket 114 are configured for allowing steam to pass therethrough. These holes may be in a staggered arrangement or may be alternatively arranged. Further, the second container could be otherwise shaped, arranged, and/or configured without departing from the disclosure.

MEIM in the form of a shield 130 extends around the interior of the second container 114. The shield 130 is mounted to, and concentric with, the sidewall 124. The shield 130 may be substantially like the shield 30 discussed above, or this MEIM may be in any other suitable configuration. As schematically illustrated by stippling in FIGS. 12 and 13, MEIM in the form of at least one susceptor is mounted to the upper surface of the bottom wall 128, typically without obstructing the holes in the bottom wall. These one or more susceptors of the bottom wall 128 may be substantially like the above-discussed susceptors for the bottom wall 28 of the second container 14 of the first embodiment.

The second container 114 may fit concentrically in the interior space 121 of the first container 112 so that the sidewall 124 and bottom wall 128 are suspended (e.g., at least partially suspended) by the suspension arms 162, and the flanges 126 are engaged to (e.g., in opposing face-to-face contact with) and supported by the flange 120 of the first container 112. The flanges 120, 126 may be connected to one another, such as by way of adhesive material or other suitable fastening features, or more specifically by heat seals comprising thermoplastic material. As with the first embodiment, the placement of the second container 114 within the first container 112 creates a first compartment 135 of the package 110 that is below the bottom wall 128 of the second container and a second compartment 137 of the package that is above the bottom wall of the second container. In one embodiment, the side walls 124 of the second container 114 may be at least partially in face-to-face contact with the side walls 118 of the first container 112.

Figure 15:
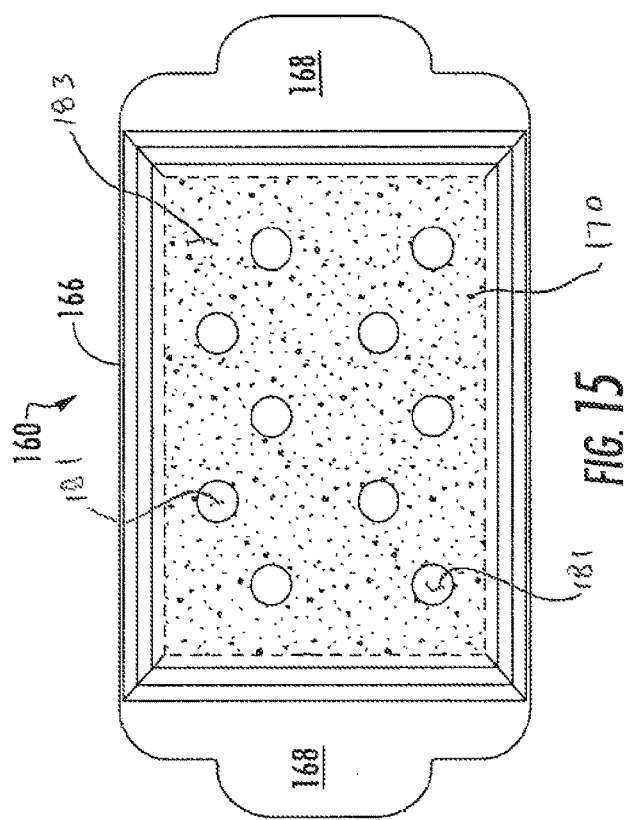
FIG. 15 is a top view of the third container of FIG. 14.

The third container 160 is shown in isolation in FIGS. 14 and 15. The upwardly open upper basket 160 may have a frusto-pyramidal assembly of the sidewalls ("sidewall 166"), an assembly of flanges ("flange 168") extending outwardly from the upper edge of the sidewall 166, and a rectangular bottom wall 170 extending inwardly from the lower periphery from the sidewall 166. A plurality of vent openings 181 (e.g., holes or perforations) extends through the bottom wall 170 of the third container 160. Each of the openings 181 in the bottom wall 170 of the third container 160 is configured for allowing steam to pass therethrough. These holes may be in a staggered arrangement or alternative arranged. The bottom wall 170 and the side walls 166 cooperate to form a third interior space 183 of the third container 160. Further, the third container could be otherwise shaped, arranged, and/or configured without departing from the disclosure.

MEIM in the form of a shield 130 extends around the interior of the upper basket 160. The shield 130 is mounted to, and concentric with, the sidewall 166. The shield 130 may be substantially like the shield 30 discussed above, or this MEIM may be in any other suitable configuration. As schematically illustrated by stippling in FIGS. 14 and 15, MEIM in the form of at least one susceptor is mounted to the upper surface of the bottom wall 170, typically without obstructing the holes in the bottom wall. These one or more susceptors that are mounted to the bottom wall 170 may be substantially like the above-discussed susceptors.

The third container 160 may fit concentrically in the box 112 and between the suspension arms 162, so that the sidewall 166 and bottom wall 170 are suspended (e.g., at least partially suspended) by the flanges 168, and the flanges 168 are engaged to (e.g., in opposing face-to-face contact with) and supported by the flanges 126 (FIG. 9) of the lower basket 114. The flanges 126, 168 may be connected to one another, such as by way of adhesive material or other suitable fastening features, or more specifically by heat seals comprising thermoplastic material. The flange extensions 164 may be folded on top of the flanges 168 for increased restraint. The flange extensions 164 and flanges 168 may be connected to one another, such as by way of adhesive material or other suitable fastening features, or more specifically by heat seals comprising thermoplastic material.

Features may be associated with the flanges 120, 126, 168, flange extensions 164 and/or the connections (e.g., seals) therebetween for allowing these connections to be reasonably easily manually broken or separated by a user of the package 110. For example, the flanges 120, 126, 168, and flange extensions 164 may comprise grooves, an alternating series of grooves and/or other features for allowing the subject connections (e.g., seals) to be reasonably easily manually broken or otherwise separated, for facilitating at least partial disassembly of the package 110. For example, each of the flange extensions 164 of the second container 114 is shown as including a hole or gap 172 (FIG. 12) through which a tab 174 (FIG. 14) of the flange 168 extends, wherein the tab 174 is positioned over a hole or gap 176 (FIG. 10) in the flange 120.

In the fully assembled (e.g., closed) configuration of the package 110, wherein the second and third containers 114, 160 are nested into the first container 112 as discussed above, the package incudes a third compartment 185 above the bottom wall 170 of the third container and below the cover 116. The annular margin of the cover 116 may be fixedly, selectively removably mounted to upwardly exposed portions of the flanges 120, 168 and flange extensions 164 for closing (e.g., hermetically sealing closed) the upper opening of the box 112. The cover 116 may be mounted in this location by way of adhesive material or other suitable fastening features, or more specifically by a heat seal comprising thermoplastic material. The cover 116 may have MEIM in the form of one or more top shields 150 (FIG. 9) that may be configured to operate as one or more ameliorators. The top shields 150 may be substantially like top shields 50 discussed above, having voids or openings 151 and the ameliorator(s) of the cover 116 may be substantially like the ameliorator(s) of the cover 16 that are discussed above, or these MEIMs may be in any other suitable configuration.

Regarding usage of the package 110, a source of steam is typically placed in the first compartment 35 and is supported by the bottom panel 122 of the first container 112, so that the steam source is positioned in the bottom of the interior of the package. The steam source may be like that described above for the first embodiment. Frozen/refrigerated food to be steamed is typically placed in the second compartment 37 supported by the bottom wall 128 of the second container 114 and the third compartment 185 supported by the bottom wall 170 of the third container 160. The package 110 may be characterized as a dual layer package for the food to be steamed in that two separate compartments 137, 185 can contain food product to be heated by steam and by microwave energy. Similar or different types of food can be loaded in the respective compartments 137, 185. When the second and third containers 114, 160 are positioned in the first container 112 so that the package 110 is assembled as discussed above, the bottom wall 128 of the second container, which typically supports some of the food to be steamed, is elevated or spaced apart from the bottom wall 122 of the first container. The bottom wall 128 of the second container 114 is typically elevated at least slightly above the steam source so that enough vertical space is provided between steam source and the food to be steamed for steam circulation between steam source and the food to be steamed. Similarly, the bottom wall 170 of the third container 160, which typically supports some of the food to be steamed, is elevated above the bottom wall 128 of the second container 114. The bottom wall 170 is typically elevated at least slightly above the food in the second compartment 137 so that enough vertical space is provided for steam circulation.

A third embodiment of this disclosure is like the first and second embodiments, except for variations noted and variations that will be apparent to one of ordinary skill in the art. Due to the similarity, components of the third embodiment that are identical, similar and/or function in at least some ways similarly to corresponding components of the first and embodiments have reference numbers incremented by 200 and 100, respectively.

Figure 16:
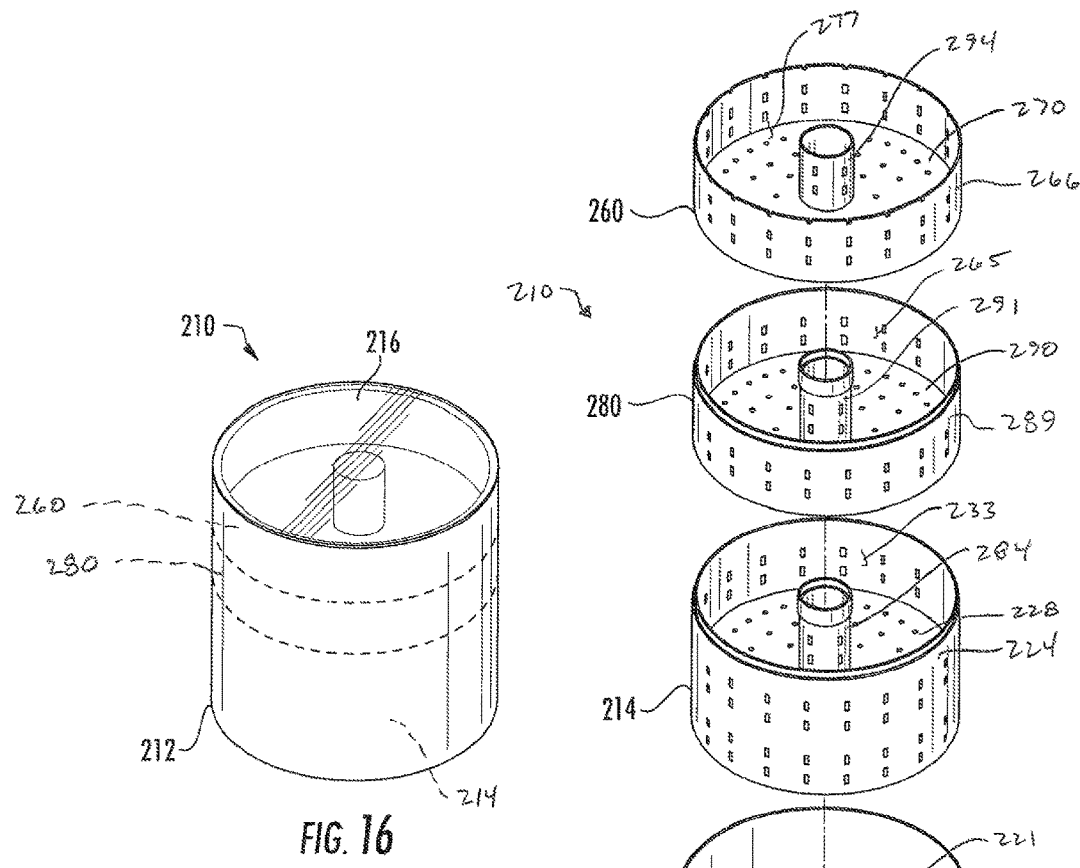
FIG. 16 is a perspective view of a package of a third embodiment of the disclosure.
Figure 17:
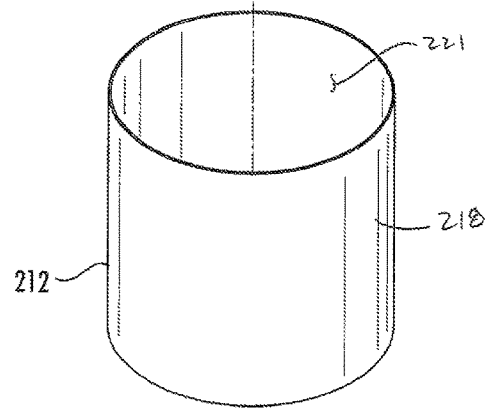
FIG. 17 is an exploded view of the package of FIG. 16.

FIG. 16 illustrates an apparatus, or more specifically a package 210, that may be used for combined steam and microwave heating of food in a domestic microwave oven, and FIG. 17 shows a portion of the package 210 in an exploded configuration, in accordance with the third embodiment. The package 210 may comprise one or more cylindrical features or containers 212, 214, 260, 280 which may be arranged in a cylinder(s)-within-cylinder arrangement, although these features may be any other suitable structures and may be arranged in any other suitable configurations.

The package 210 includes an outer (first) container 212 that, in isolation, is upwardly open and may be in the form of a cylindrical canister. The package 210 further includes at least one inner (second) container 214 that, in isolation, is upwardly open. The second container 214 may be referred to as a basket, or more specifically a lower basket 214. Optionally, the package 210 further includes a third inner (fourth) container 280 that, in isolation, is upwardly open. The third container 280 may be referred to as an intermediate basket 280. Optionally, the package 210 further includes a top (fourth) container 260 that, in isolation, is upwardly open.

The containers 214, 260, 280 may be referred to together as a composite or multipart basket assembly. The fourth container 260 may be referred to as an upper basket 260. The package 210 further includes a cover 216, similar to the covers 16, 116 of the previous embodiments.

Figure 19:
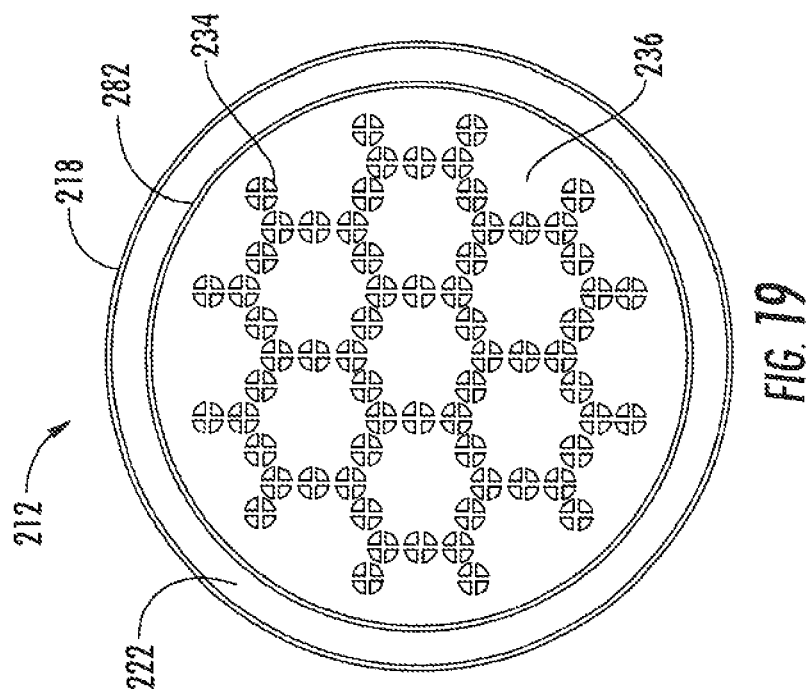
FIG. 19 is a schematic, top view of the first container of FIG. 18.
Figure 18:
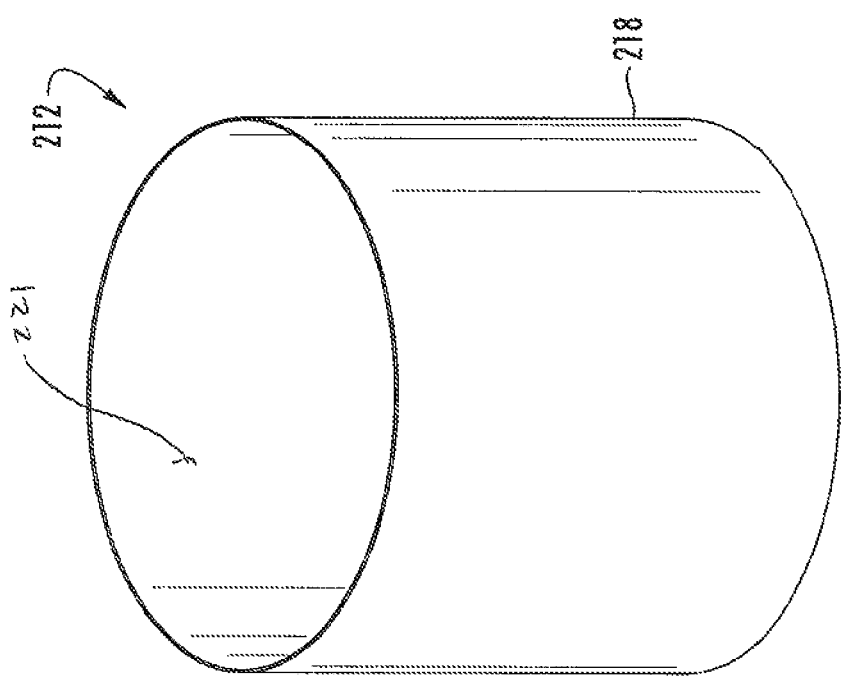
FIG. 18 is a perspective view of a first container of the package of FIG. 16.
Figure 20:
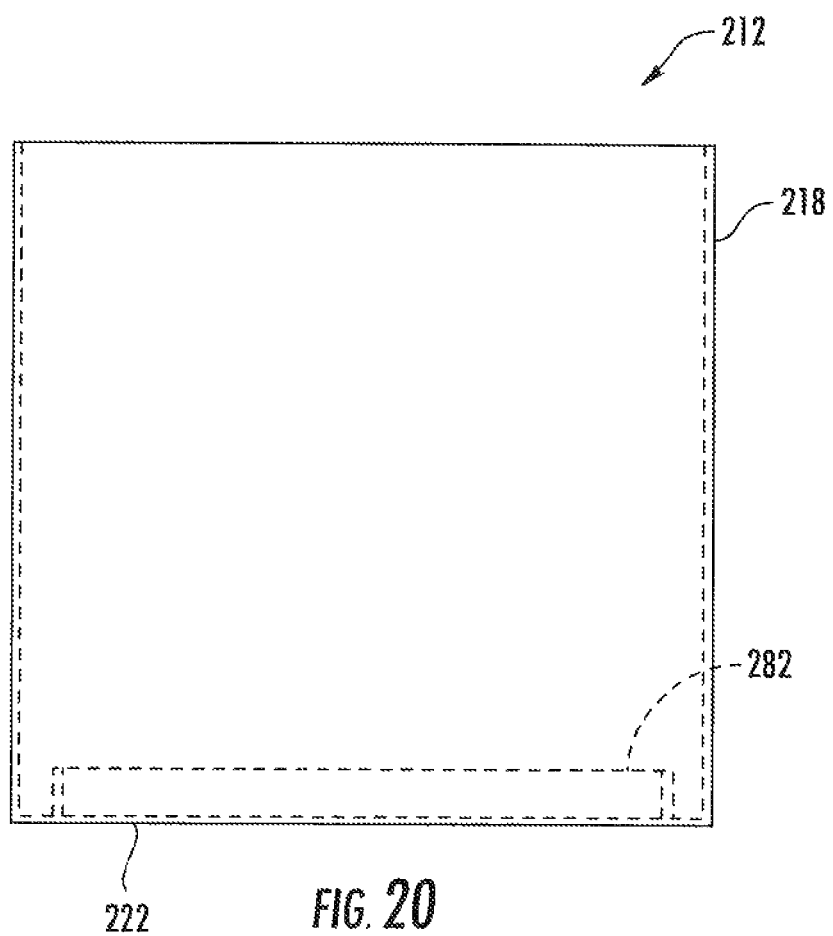
FIG. 20 is a schematic, side elevation view of the first container of FIG. 18.

The first container 212 is shown in isolation in FIGS. 18-20 and includes a cylindrical sidewall 218, a circular bottom wall 222 extending inwardly from the lower edge of the sidewall so that the canister is downwardly closed, and an upright, cylindrical flange 282. The flange 282 is coaxial with the sidewall 218 and spaced inwardly from the sidewall and typically is fixedly connected to the bottom wall 222. The flange 282 may be configured for being cooperative for interacting with the lower end of the second container 214 for providing a coaxial, releasable interference fit, or the like, therebetween. In addition, the flange 282 operates as a guide for facilitating coaxial positioning of the second container 214 within the interior space 221 of the first container 212, such that the flange 282 may be referred to as a guide, or the like. More generally, the flange 282 may be referred to as a feature for, or replaced with any other suitable structure for, guiding and/or mounting (e.g., releasably mounting) the second container 214 in the first container 212, wherein the flange or other suitable structure may comprise a releasable fastening or interlocking feature for interacting with the lower portion of the second container 214 for keeping the basket assembly 214, 260, 280 coaxially in place within the canister 212. The first container 212 could be otherwise shaped, arranged, configured, and/or omitted without departing from the disclosure.

MEIM in the form of at least one antenna pattern 234 (FIG. 19) is centrally mounted to the upper surface of the portion of the bottom wall 222 that is substantially circumscribed by the flange 282. The antenna 234 may be substantially like the antenna 34 discussed above, or this MEIM may be in any other suitable configuration. MEIM in the form of at least one susceptor 236 (FIG. 19) is mounted to the portion of the upper surface of the bottom wall 222 that is substantially circumscribed by the flange 282 and at which the antenna pattern 234 is not present, except that the MEIMs 234, 236 are typically discontiguous with one another such that gaps are provided therebetween. The susceptor 236 may be substantially like the susceptor 36 discussed above, or this MEIM may be in any other suitable configuration.

The second container 214 is shown in isolation in FIGS. 21-23 and comprises a cylindrical sidewall 224, a disk-shaped bottom wall 228 extending inwardly from an annular portion of the inner surface of the sidewall 224, and a coaxial tube or support 284 mounted to and extending through a hole in the bottom wall 228. Regarding the annular portion of the inner surface of the sidewall 224 from which the bottom wall 228 extends inwardly, this annular portion of the inner surface of the sidewall 224 is positioned between, and distant from each of, the upper and lower annular edges of the sidewall 224. As a result, the bottom wall 228 divides the interior space 233 of the second container 214 into upper and lower sections or chambers. A plurality of vent openings 242 (e.g., holes or perforations) extends the sidewall 224, a plurality of vent openings 244 extend through the bottom wall 228, and a plurality of vent openings 245 extend through the support structure or tube 284. Each of the holes is configured for allowing steam to pass therethrough. The flange 282 (FIG. 20) of the first container 212 may fit into the lower chamber of the second container 214, wherein the flange 282 engages the respective portion of the second container 214 in an interference fit, or in any other suitable manner. The second container 214 could be otherwise shaped, arranged, configured, and/or omitted without departing from the disclosure.

The upper end of the sidewall 224 and/or support 284, or one or more features associated therewith, may be configured for respectively interacting with the lower ends of the corresponding sidewall and support of the third container 280 for guiding and/or releasably mounting the second and third containers 214, 280 together. For example, upright, cylindrical, coaxial flanges 286, 288 may be respectively fixedly connected to the upper ends of the sidewall 224 and support tube 284 for cooperatively interacting with the lower end of the third container 280 and support 291, respectively, for providing a coaxial, releasable interference fits, or the like, therebetween. In addition, the flanges 286, 288 operate as guides for facilitating coaxial positioning of the second and third containers 214, 280 together and within the first container 212, such that the flanges 286, 288 may be referred to as guides, or the like. More generally, the flanges 286, 288 may be referred to as features for, or replaced with any other suitable structures for, guiding and/or releasably mounting the containers 214, 280 together, wherein the flanges 286, 288 or other suitable structures may provide or otherwise comprise releasable fastening or interlocking features for keeping at least a portion of the basket assembly 214, 260, 280 coaxially in place within the canister 212.

Figure 26:
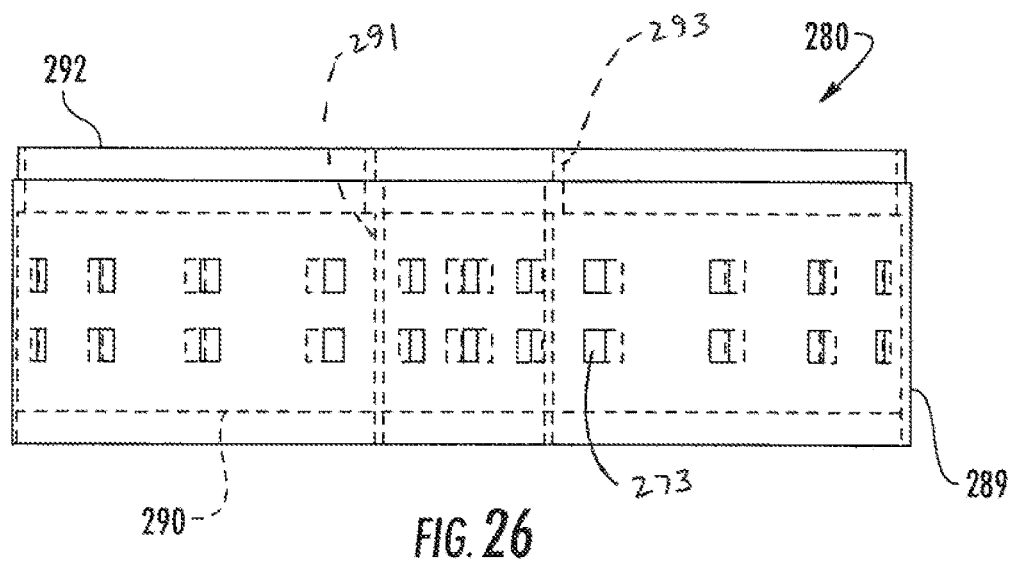
FIG. 26 is a schematic, side elevation view of the third container of FIG. 24.

The third container 280 is shown in isolation in FIGS. 24-26 and includes a cylindrical sidewall 289, a disk-shaped bottom wall 290 extending inwardly from an annular portion of the inner surface of the sidewall 289, and a coaxial tube or support 291 mounted to and extending through a hole in the bottom wall 290. Regarding the annular portion of the inner surface of the sidewall 289 from which the bottom wall 290 extends inwardly, this annular portion of the inner surface of the sidewall 289 is positioned between, and distant from each of, the upper and lower annular edges of the sidewall 289. As a result, the bottom wall 290 divides the interior space 265 of the intermediate basket 280 into upper and lower sections or chambers. A plurality of vent openings 273 (e.g., perforations or holes) extends through the sidewall 289 of the third container 280, a plurality of vent openings 281 extend through the bottom wall 290 of the third container, and a plurality of vent openings 275 extend through the support 291. Each of the holes 273, 275, 281 is configured for allowing steam to pass therethrough. The flanges 286, 288 (FIG. 21) of the second container 214 may fit into the lower chamber of the third container 280, wherein the flanges 286, 288 respectively engage the lower marginal portions of the sidewall 289 and tube 291 in an interference fit, or in any other suitable manner. The third container 280 could be otherwise shaped, arranged, configured, and/or omitted without departing from the disclosure.

The upper end of the sidewall 289 and/or tube 284, or one or more features associated therewith, may be configured for respectively interacting with the lower ends of the corresponding sidewall and tube of the fourth container 260 for guiding and/or releasably mounting the third and fourth containers 260, 280 together. For example, upright, cylindrical, coaxial flanges 292, 293 may be respectively fixedly connected to the upper ends of the sidewall 289 and tube 291 for cooperatively interacting with the lower end of the fourth container 260 and the support 294, respectively, for providing coaxial, releasable interference fits, or the like, therebetween. In addition, the flanges 292, 293 operate as guides for facilitating coaxial positioning of the containers 260, 280 together and within the interior space 221 of the first container 212, such that the flanges 292, 293 may be referred to as guides, or the like. More generally, the flanges 292, 293 may be referred to as features for, or replaced with any other suitable structures for, guiding and/or releasably mounting the containers 260, 280 together, wherein the flanges 292, 293 or other suitable structures may provide or otherwise comprise releasable fastening or interlocking features for keeping at least a portion of the basket assembly 214, 260, 280 coaxially in place within the first containers 212.

Figure 29:
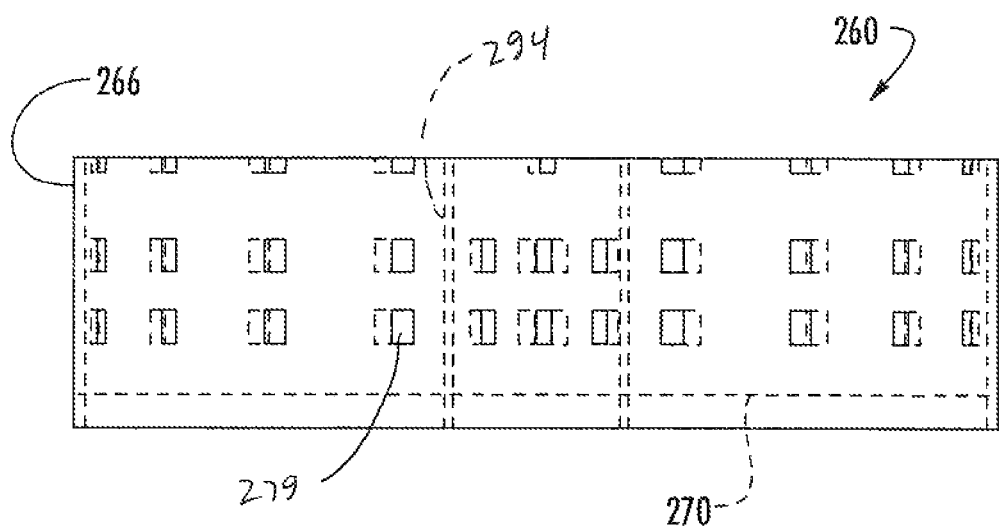
FIG. 29 is a schematic, side elevation view of the fourth container of FIG. 27.

The fourth container 260 is shown in isolation in FIGS. 27-29 and comprises a cylindrical sidewall 266, a disk-shaped bottom wall 270 extending inwardly from an annular portion of the inner surface of the sidewall 266, and a coaxial tube or support 294 mounted to and extending through a hole in the bottom wall 270. Regarding the annular portion of the inner surface of the sidewall 266 from which the bottom wall 270 extends inwardly, this annular portion of the inner surface of the sidewall 266 is positioned between, and distant from each of, the upper and lower annular edges of the sidewall 266. As a result, the bottom wall 270 divides the interior space 277 of the upper basket 260 into upper and lower sections or chambers. A plurality of vent openings 279 (e.g., perforations or holes) extends through the sidewall 266 of the fourth container, a plurality of vent openings 282 extend through the bottom wall 270, and a plurality of vent openings 287 extend through the support 294. Each of the holes 279, 282, 287 is configured for allowing steam to pass therethrough. The flanges 292, 293 (FIG. 24) of the third container 280 may fit into the lower chamber of the fourth container 260, wherein the flange 292, 293 engage the respective portions of the fourth container 260 in an interference fit, or in any other suitable manner. The fourth container 260 could be otherwise shaped, arranged, configured, and/or omitted without departing from the disclosure.

In one aspect of the third embodiment, the containers 214, 260, 280 are at least partially releasably interconnected by the support tubes 284, 291, 294 and/or the sidewalls 224, 266, 289, such as by way of flanges 286, 288, 292, 293 of these features being respectively associated other portions of these features, such as by way of a releasable interference fit, or the like. For example, a composite or multipart tube assembly 284, 291, 294 may be positioned in the center of the multipart basket assembly 214, 260, 280, and the tube assembly 284, 291, 294 may include one or more interlocking or other types of fastening features (e.g., flanges 288, 293) for releasably holding the baskets 214, 260, 280 together.

The support tubes 284, 291, 294 each have a plurality of holes extending laterally therethrough for allowing penetration and circulation of steam at the center of the basket assembly 214, 260, 280. In the fully assembled configuration of the package 210, an annular side chamber is defined between the sidewall 218 of the first container 212 and the sidewalls 224, 266, 289 of the respective containers 214, 280, 260, as a result, for example, of the outer diameter of the first container 212 being larger than the outer diameter of the assembled second, third, and fourth containers 214, 260, 280. This side chamber is an area for receiving steam and allowing the steam to circulate therein, so that steam may circulate through holes 242, 273, 279 in the sidewalls 224, 266, 289. The containers 212, 214, 260, 280 may be constructed of rigid polymer material, paper material, and/or any other suitable materials. Optionally, one or more of the containers 212, 214, 260, 280 may include MEIM that substantially corresponds to the shields 30, 130 and/or above-discussed susceptors schematically illustrated in FIGS. 4, 12, 13, 14, and 15 by stippling, typically with the MEIM not obstructing the holes in the baskets, although any other suitable MEIM may be utilized.

In the assembled package 210 of the fourth embodiment, the second container 214 can be located in the first container 212 to create a first compartment at the bottom of the package similar to the previous embodiments located between the spaced apart bottom panels 228, 222 of the respective second container and first container. A source of steam can be placed in the first compartment of the package. The third container 280 can be placed in the first container 212 and in engagement with the second container 214 so that a second compartment of the package 210 is defined between the spaced apart bottom walls 228, 290 of the respective second and third containers. The fourth container 260 can be placed in the first container 212 and in engagement with the third container 280 so that a third compartment of the package 210 is defined between the spaced apart bottom walls 290, 270 of the respective third and fourth containers. The cover 216 can be placed on top of the container 212 so that a fourth compartment of the package 210 is defined between the bottom wall 270 of the fourth container 260 and the cover. The package 210 is capable of heating separate food products placed in the respective second compartments, third compartment, and fourth compartment by steam that circulates through the package and microwave heating. The food products in a respective compartment are supported by a respective bottom wall 228, 290, 270 of the second, third, and fourth containers 214, 280, 260. The package 210 could be otherwise shaped, arranged, configured, and or used without departing from the disclosure. For example less than three food products could be heated in the package 210 without departing from the disclosure. Multiple sources of steam could be placed in the various compartments of the package 210 without departing from the disclosure.

Further regarding the above-discussed MEIMs, a susceptor is a thin layer of MEIM that tends to absorb at least a portion of impinging microwave energy and convert it to thermal energy (i.e., heat) through resistive losses in the layer of MEIM. The remainder of the microwave energy is either reflected by or transmitted through the susceptor. Typical susceptors comprise aluminum, generally less than about 500 angstroms in thickness, for example, from about 60 to about 100 angstroms in thickness, and having an optical density of from about 0.15 to about 0.35, for example, about 0.17 to about 0.28.

The MEIM may comprise an electroconductive or semiconductive material, for example, a vacuum deposited metal or metal alloy, or a metallic ink, an organic ink, an inorganic ink, a metallic paste, an organic paste, an inorganic paste, or any combination thereof. Examples of metals and metal alloys that may be suitable include, but are not limited to, aluminum, chromium, copper, inconel alloys (nickel-chromium-molybdenum alloy with niobium), iron, magnesium, nickel, stainless steel, tin, titanium, tungsten, and any combination or alloy thereof.

Alternatively, the MEIM may comprise a metal oxide, for example, oxides of aluminum, iron, and tin, optionally used in conjunction with an electrically conductive material. Another metal oxide that may be suitable is indium tin oxide (ITO). ITO has a more uniform crystal structure and, therefore, is clear at most coating thicknesses.

Alternatively still, the MEIM may comprise a suitable electroconductive, semiconductive, or non-conductive artificial dielectric or ferroelectric. Artificial dielectrics comprise conductive, subdivided material in a polymeric or other suitable matrix or binder, and may include flakes of an electroconductive metal, for example, aluminum.

In other embodiments, the MEIM may be carbon-based, for example, as disclosed in U.S. Pat. Nos. 4,943,456, 5,002,826, 5,118,747, and 5,410,135.

In still other embodiments, the MEIM may interact with the magnetic portion of the electromagnetic energy in the microwave oven. Correctly chosen materials of this type can self-limit based on the loss of interaction when the Curie temperature of the material is reached. An example of such an interactive coating is described in U.S. Pat. No. 4,283,427.

MEIMs may be combined with films, such as to create microwave susceptor structures that may be referred to as susceptor films. Susceptor film may be laminated or otherwise joined to another material, such as, but not limited to, a surface of a wall of a package or other suitable structure. In one example, the susceptor film may be laminated or otherwise joined to paper or paperboard to make a susceptor structure having a higher thermal flux output than conventional paper or paperboard based susceptor structures. The paper may have a basis weight of from about 15 to about 60 lb/ream (lb/3000 sq. ft.), for example, from about 20 to about 40 lb/ream, for example, about 25 lb/ream. The paperboard may have a basis weight of from about 60 to about 330 lb/ream, for example, from about 80 to about 140 lb/ream. The paperboard generally may have a thickness of from about 6 to about 30 mils, for example, from about 12 to about 28 mils. In one particular example, the paperboard has a thickness of about 14 mils (0.014 inches). Any suitable paperboard may be used, for example, a solid bleached sulfate board, for example, Fortress® board, commercially available from International Paper Company, Memphis, Tenn., or solid unbleached sulfate board, such as SUS® board, commercially available from Graphic Packaging International.

Alternatively, the susceptor film may be laminated or otherwise joined to another polymer film. It is contemplated that the polymer film would exhibit little or no shrinkage, similar to its base film counterpart, such that the performance attributes of the susceptor film are not adversely affected. It is also contemplated that such polymer films may be clear, translucent, or opaque, as needed for a particular application. It is further contemplated that the laminated (or otherwise joined) structures may be capable of being thermoformable. It is anticipated that shallow draw shapes could preserve susceptor functionality in all but the highest stretch areas during thermoforming, and one could advantageously use die and/or plug design to tailor local stretch ratios to customize degree of susceptor functionality. The inherently lower crystallinity of the films of this disclosure lend themselves advantageously to formability, as high crystalline materials do not form easily, particularly on in-line form-fill-seal packaging machinery. Post crystallization of formed structures may be induced through methods common to those skilled in the art.

If desired, the susceptor base film may undergo one or more treatments to modify the surface prior to depositing the MEIM onto the polymer film. By way of example, and not limitation, the polymer film may undergo a plasma treatment to modify the roughness of the surface of the polymer film. While not wishing to be bound by theory, it is believed that such surface treatments may provide a more uniform surface for receiving the MEIM, which in turn, may increase the heat flux and maximum temperature of the resulting susceptor structure. Such treatments are discussed in U.S. Patent Application Publication No. 2010/0213192A1 and U.S. patent application Ser. No. 13/804,673, filed Mar. 14, 2013, both of which are incorporated by reference herein in its entirety.

Also, if desired, the susceptor film may be used in conjunction with other microwave energy interactive elements and/or structures. Structures including multiple susceptor layers are also contemplated. It will be appreciated that the use of the present susceptor film and/or structure with such elements and/or structures may provide enhanced results as compared with a conventional susceptor.

By way of example, the susceptor film may be used with a foil or high optical density evaporated material having a thickness sufficient to reflect a substantial portion of impinging microwave energy. Such elements typically are formed from a conductive, reflective metal or metal alloy, for example, aluminum, copper, or stainless steel, in the form of a solid patch generally having a thickness of from about 0.000285 inches to about 0.005 inches, for example, from about 0.0003 inches to about 0.003 inches. Other such elements may have a thickness of from about 0.00035 inches to about 0.002 inches, for example, 0.0016 inches.

In some cases, microwave energy reflecting (or reflective) elements may be used as shielding elements where the food item is prone to scorching or drying out during heating. In other cases, smaller microwave energy reflecting elements may be used to diffuse or lessen the intensity of microwave energy. One example of a material utilizing such microwave energy reflecting elements is commercially available from Graphic Packaging International, Inc. (Marietta, Ga.) under the trade name MicroRite® packaging material. In other examples, a plurality of microwave energy reflecting elements may be arranged to form a microwave energy distributing element to direct microwave energy to specific areas of the food item. If desired, the loops may be of a length that causes microwave energy to resonate (e.g., a resonating patch antenna), thereby enhancing the distribution effect. Examples of microwave energy distributing elements are described in U.S. Pat. Nos. 6,204,492, 6,433,322, 6,552,315, and 6,677,563, each of which is incorporated by reference in its entirety.

In still another example, the susceptor film and/or structure may be used with or may be used to form a microwave energy interactive insulating material. Examples of such materials are provided in U.S. Pat. Nos. 7,019,271, 7,351,942, and U.S. Patent Application Publication No. 2008/0078759 A1, published Apr. 3, 2008, each of which is incorporated by reference herein in its entirety.

If desired, any of the numerous microwave energy interactive elements described herein or contemplated hereby may be substantially continuous, that is, without substantial breaks or interruptions, or may be discontinuous, for example, by including one or more breaks or apertures that transmit microwave energy. The breaks or apertures may extend through the entire structure, or only through one or more layers. The number, shape, size, and positioning of such breaks or apertures may vary for a particular application depending on the type of construct being formed, the food item to be heated therein or thereon, the desired degree of heating, browning, and/or crisping, whether direct exposure to microwave energy is needed or desired to attain uniform heating of the food item, the need for regulating the change in temperature of the food item through direct heating, and whether and to what extent there is a need for venting.

By way of illustration, a microwave energy interactive element may include one or more transparent areas to effect dielectric heating of the food item. However, where the microwave energy interactive element comprises a susceptor, such apertures decrease the total microwave energy interactive area, and therefore, decrease the amount of MEIM available for heating, browning, and/or crisping the surface of the food item. Thus, the relative amounts of microwave energy interactive areas and microwave energy transparent areas must be balanced to attain the desired overall heating characteristics for the particular food item.

As another example, one or more portions of a susceptor may be designed to be microwave energy inactive to ensure that the microwave energy is focused efficiently on the areas to be heated, browned, and/or crisped, rather than being lost to portions of the food item not intended to be browned and/or crisped or to heating the environment. Additionally or alternatively, it may be beneficial to create one or more discontinuities or inactive regions to prevent overheating or charring of the food item and/or the construct including the susceptor.

As still another example, a susceptor may incorporate one or more "fuse" elements that limit the propagation of cracks in the susceptor, and thereby control overheating, in areas of the susceptor where heat transfer to the food is low and the susceptor might tend to become too hot. The size and shape of the fuses may be varied as needed. Examples of susceptors including such fuses are provided, for example, in U.S. Pat. No. 5,412,187, U.S. Pat. No. 5,530,231, U.S. Patent Application Publication No. 2008/0035634A1, published Feb. 14, 2008, and PCT Application Publication No. WO 2007/127371, published Nov. 8, 2007, each of which is incorporated by reference herein in its entirety.

It will be noted that any of such discontinuities or apertures in a susceptor may comprise a physical aperture or void in one or more layers or materials used to form the structure or construct, or may be a non-physical "aperture". A non-physical aperture is a microwave energy transparent area that allows microwave energy to pass through the structure without an actual void or hole cut through the structure. Such areas may be formed by simply not applying MEIM to the particular area, by removing MEIM from the particular area, or by mechanically deactivating the particular area (rendering the area electrically discontinuous). Alternatively, the areas may be formed by chemically deactivating the MEIM in the particular area, thereby transforming the MEIM in the area into a substance that is transparent to microwave energy (i.e., so that the microwave energy transparent or inactive area comprises the MEIM in an inactivated condition). While both physical and non-physical apertures allow the food item to be heated directly by the microwave energy, a physical aperture also provides a venting function to allow steam or other vapors or liquid released from the food item to be carried away from the food item.

In the foregoing, all values, relationships, configurations and other features may be approximate. For example, the above-described concentric relationships may be approximate, generally and/or substantially concentric. As another example, the features described above has having a particular shape (e.g., a cylindrical, frustoconical, annular or disk shape) may be described as approximately, generally and/or substantially having the subject shape.

The above examples are in no way intended to limit the scope of the present disclosure. It will be understood by those skilled in the art that while the present disclosure has been discussed above with reference to exemplary embodiments, various additions, modifications and changes can be made thereto without departing from the spirit and scope of the disclosure as set forth in the claims.

What is claimed is:

1. A method of heating a food product in a package in a microwave oven, the method comprising:
    obtaining a first container having a first sidewall and a first bottom wall, the first sidewall and the first bottom wall cooperating to form a first interior space;
    obtaining a second container having a second sidewall, a second bottom wall, and a first support tube, each of the second sidewall and the first support tube extending from the second bottom wall, the second sidewall and the second bottom wall cooperating to form a second interior space, the second bottom wall having at least one vent opening, wherein the second container further comprises a coaxial flange at an upper end of the second sidewall;
    obtaining a third container having a third sidewall, a third bottom wall, and a second support tube, each of the third sidewall and the second support tube extending from the third bottom wall;
    positioning the second container in the first interior space so that the second interior space comprises a portion of the first interior space and the second bottom wall is spaced apart from the first bottom wall to form a first compartment below the second bottom wall and a second compartment above the second bottom wall;
    positioning the third container in the first interior space so that the third bottom wall is spaced apart from the second bottom wall, the positioning the third container comprising engaging the second support tube with the first support tube and engaging a lower marginal portion of the third sidewall with an upper marginal portion of the second sidewall so that the first support tube and the second sidewall support the third container, wherein the engaging the lower marginal portion of the third sidewall with the upper marginal portion of the second sidewall comprises engaging the coaxial flange of the second container with the lower marginal portion of the third sidewall so that the coaxial flange engages an interior surface of a portion of the third sidewall that extends downwardly from the third bottom wall toward the first bottom wall;
    placing a source of steam in the first compartment so that the source of steam is supported by the first bottom wall;
    placing a food product in the second compartment so that the food product is supported by the second bottom wall; and
    heating the package in a microwave oven so that steam is created in the first compartment and circulates to the second compartment through the at least one vent opening in the second bottom wall so that the food product is heated by the steam and microwave energy.

2. The method of claim 1, wherein the positioning the second container in the first container comprises engaging the second sidewall with a support on the first bottom wall.

3. The method of claim 1, the third sidewall and the third bottom wall cooperating to form a third interior space, and further comprising positioning the third container so that the third interior space comprises a portion of the first interior space and the third bottom wall and the second bottom wall at least partially define a third compartment above the third bottom wall.

4. The method of claim 3, wherein the food product is a first food product, the method further comprising placing a second food product in the third compartment.

5. The method of claim 3, further comprising obtaining a fourth container having a fourth sidewall and a fourth bottom wall, the fourth sidewall and the fourth bottom wall cooperating to form a fourth interior space, and positioning the fourth container so that the fourth interior space comprises a portion of the first interior space and the fourth bottom wall is spaced apart from the third bottom wall to at least partially define a fourth compartment above the fourth bottom wall.

6. The method of claim 5, further comprising placing a third food product in the fourth compartment.

7. The method of claim 1, wherein the first container comprises a susceptor on the first bottom wall for absorbing at least a portion of the microwave energy and wherein the heating the package comprises providing heat from the susceptor to the source of steam to create steam in the package.

8. The method of claim 7, wherein the first container comprises an antenna pattern on the first bottom wall, and the heating the package comprises directing at least a portion of the microwave energy from the antenna pattern to the source of steam to create steam in the package.

9. The method of claim 1, wherein the second bottom wall comprises microwave interactive material and the heating the package comprises heating the food product by way of the microwave interactive material.

10. The method of claim 1, wherein the first container is an outer container, the first sidewall is an outer sidewall, and the first bottom wall is an outer bottom wall, the second container is an inner container, the second side wall is an inner sidewall, and the second bottom wall is an inner bottom wall.

11. The method of claim 10, the first support tube being mounted to the inner bottom wall, wherein the inner sidewall comprises a first portion extending downwardly from the inner bottom wall toward the outer bottom wall and a second portion extending upwardly from the inner bottom wall.

12. The method of claim 11, wherein the inner container is a first inner container and the third container is a second inner container.

13. The method of claim 12, wherein the first portion of the inner sidewall, the outer bottom wall, and the inner bottom wall at least partially define the first compartment, the second portion of the inner sidewall and the inner bottom wall at least partially define the second compartment.

14. The method of claim 13, wherein the inner bottom wall comprises a plurality of first vent openings for allowing steam to pass from the first compartment to the second compartment, and the first support tube is in fluid communication with the first compartment and comprises a plurality of second vent openings for allowing steam to pass from the first compartment to the second compartment via the first support tube.

15. The method of claim 14, wherein the first support tube extends downwardly from the inner bottom wall in the first compartment and upwardly from the inner bottom wall in the second compartment, the first support tube is in fluid communication with the second compartment via the plurality of second vent openings, and the first support tube is in fluid communication with the first compartment via a plurality of third vent openings.

16. The method of claim 15, wherein a side chamber is defined between the outer sidewall and the inner sidewall, and the inner sidewall comprises a plurality of fourth vent openings extending in the first portion and the second portion of the inner sidewall for allowing steam to pass from the first compartment to the side chamber and from the side chamber to the second compartment.

17. The method of claim 15, wherein:
the inner sidewall comprises a first inner sidewall, and the inner bottom wall comprises a first inner bottom wall;
the third sidewall is a second inner sidewall, and the third bottom wall is a second inner bottom wall, the second support tube being mounted to the second inner bottom wall;
the coaxial flange is a first flange extending upwardly from the second portion of the first inner sidewall and the first inner container comprises a second flange extending upwardly from the first support tube; and
the engaging the second support tube with the first support tube comprises positioning the second inner container with the second support tube at least partially received by the second flange.

18. The method of claim 17 wherein the food product is a first food product, the second inner sidewall and the second inner bottom wall at least partially define a third compartment, and the second inner bottom wall comprises a plurality of fourth vent openings for allowing steam to pass from the second compartment to the third compartment, and the method comprises placing a second food product in the third compartment.

\* \* \* \* \*